(12) United States Patent
Vieth

(10) Patent No.: US 6,205,248 B1
(45) Date of Patent: Mar. 20, 2001

(54) METHOD AND SYSTEM FOR COMPRESSING DATA IN A MULTI-CHANNEL IMAGE PROCESSING SYSTEM

(75) Inventor: John O. G. Vieth, Waterloo (CA)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 08/188,365

(22) Filed: Jan. 27, 1994

Related U.S. Application Data

(63) Continuation of application No. 07/770,794, filed on Oct. 3, 1991, now abandoned.

(51) Int. Cl.[7] .................................................. G06K 9/36
(52) U.S. Cl. .......................................... 382/232; 382/304
(58) Field of Search .................................. 382/56, 27, 41, 382/49, 232, 304; 358/431, 427, 261.1, 261.2, 261.3

(56) References Cited

U.S. PATENT DOCUMENTS

| | | |
|---|---|---|
| 3,588,329 | 6/1971 | Monk et al. . |
| 4,314,281 | 2/1982 | Wiggins et al. . |
| 4,326,258 | 4/1982 | de la Guardia . |
| 4,398,221 | 8/1983 | Yamaguchi . |
| 4,410,916 | 10/1983 | Pratt et al. . |
| 4,433,346 | 2/1984 | Stoffel et al. . |
| 4,484,349 * | 11/1984 | McCubbrey ........................ 382/308 |
| 4,509,194 | 4/1985 | Harrington . |
| 4,571,634 | 2/1986 | Caneschi et al. . |
| 4,575,768 | 3/1986 | Sakai et al. . |
| 4,590,606 * | 5/1986 | Rohrer ................................ 382/245 |
| 4,597,106 | 6/1986 | Nakamura et al. . |
| 4,652,935 | 3/1987 | Endoh et al. . |
| 4,654,719 | 3/1987 | Tomita . |
| 4,684,997 | 8/1987 | Romeo et al. . |
| 4,688,100 | 8/1987 | Haganuma et al. . |
| 4,716,471 | 12/1987 | Yokomizo . |
| 4,719,514 | 1/1988 | Kurahayashi et al. . |
| 4,757,552 * | 7/1988 | Asano et al. ........................ 382/232 |
| 4,807,043 * | 2/1989 | Kaku et al. ........................ 358/261.3 |
| 4,888,812 | 12/1989 | Dinan et al. . |
| 5,007,100 * | 4/1991 | D'Aoust et al. .................... 382/303 |
| 5,048,104 * | 9/1991 | D'Aoust et al. .................... 382/293 |
| 5,055,919 * | 10/1991 | Klein et al. ....................... 358/261.1 |
| 5,212,742 * | 5/1993 | Normile et al. ................... 382/166 |
| 5,317,652 * | 5/1994 | Chatterjee ......................... 382/304 |

FOREIGN PATENT DOCUMENTS

| | | |
|---|---|---|
| 0284281 | 3/1988 | (EP) . |
| 0378762 | 10/1989 | (EP) . |

* cited by examiner

*Primary Examiner*—Jon Chang

(57) ABSTRACT

A system and method for processing image data from a document and for producing a compressed binarized version of the image data for transmission to or use by subsequent users. Processing of the image data is done in parallel after the scanning of the document is started but before the entire document is scanned. A splitter is used to divide a scan line of image data produced by an imager at the scan line into a plurality of channels, with each channel having at least one overlap area of pixels and with the overlap areas of pixels being used to avoid errors between channels. Thresholding and compression are performed by each one of the channels in parallel. The compression is performed in a direction which is perpendicular to the direction of scanning and conforms to a standard compression algorithm like CCITT Group 4.

10 Claims, 22 Drawing Sheets

SCANNING LINE 14

SCANNER 18, (2 CHANNELS)
CHANNEL #1 - 0, 2, 4, 6, 8 ...
CHANNEL #2 - 1, 3, 5, 7, 9 ...

SCANNER 18-1, (4 CHANNELS)
CHANNEL #1 - 0, 4, 8, 12 ...
CHANNEL #2 - 1, 5, 9, 13 ...
CHANNEL #3 - 2, 6, 10, 14 ...
CHANNEL #4 - 3, 7, 11, 15 ...

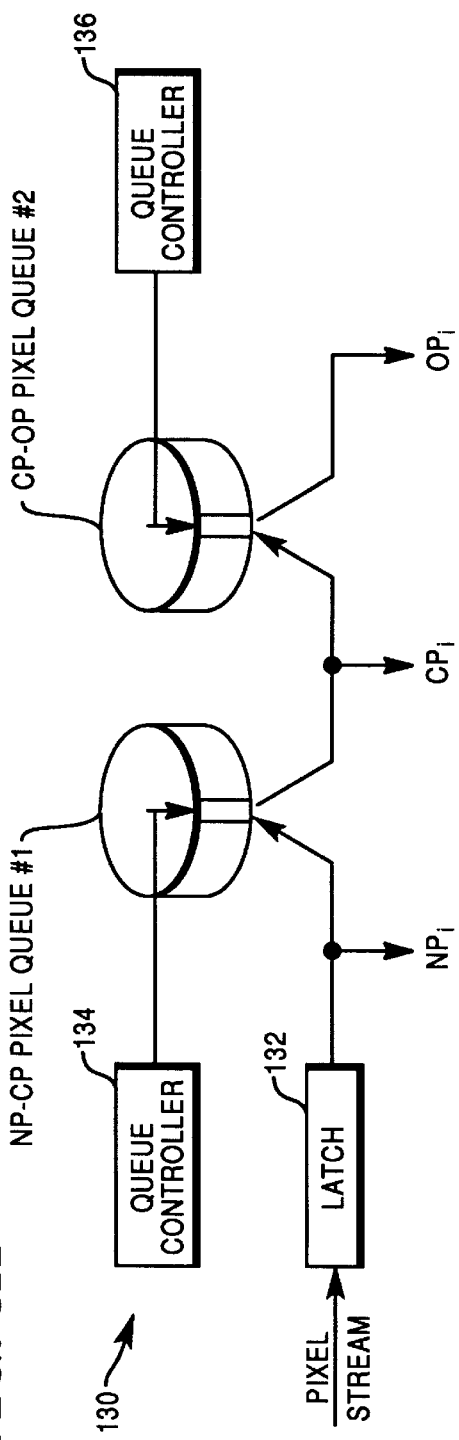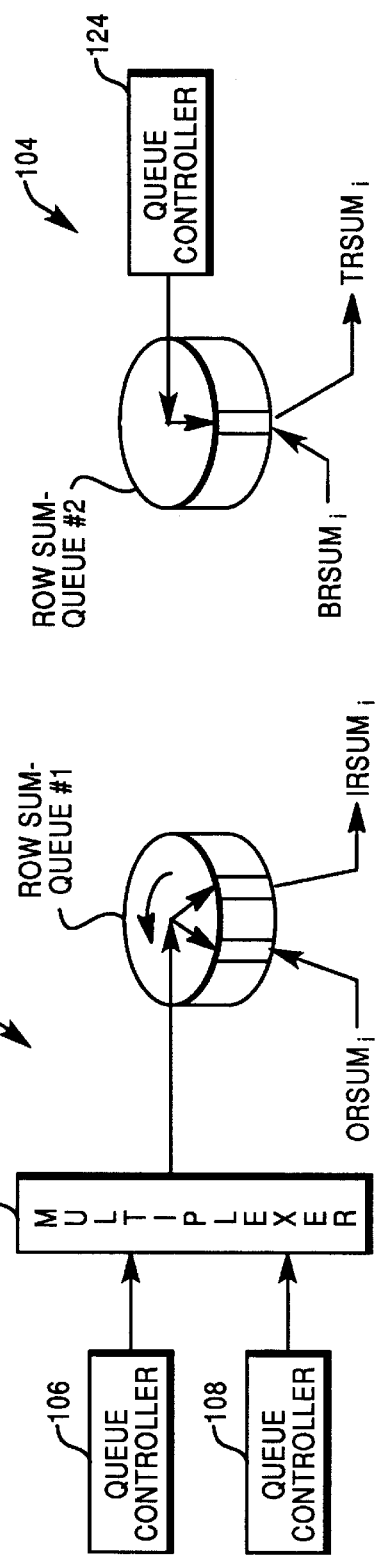
FIG. 8A
FIG. 8B
FIG. 8C

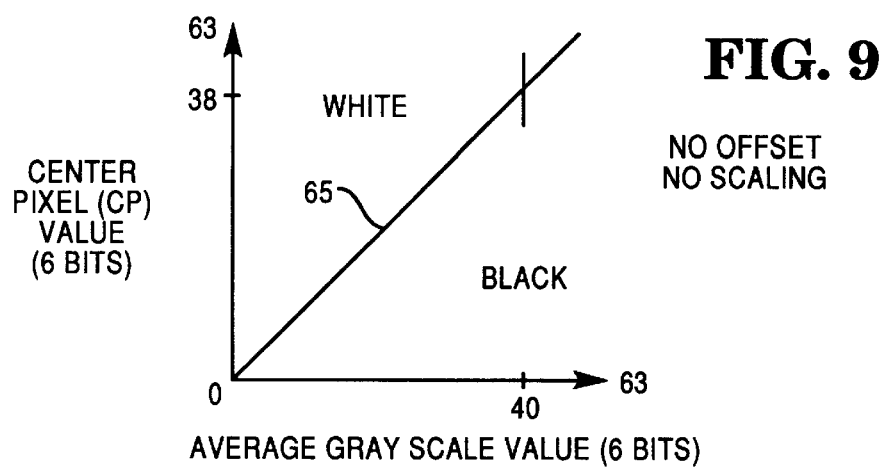
FIG. 9 NO OFFSET NO SCALING
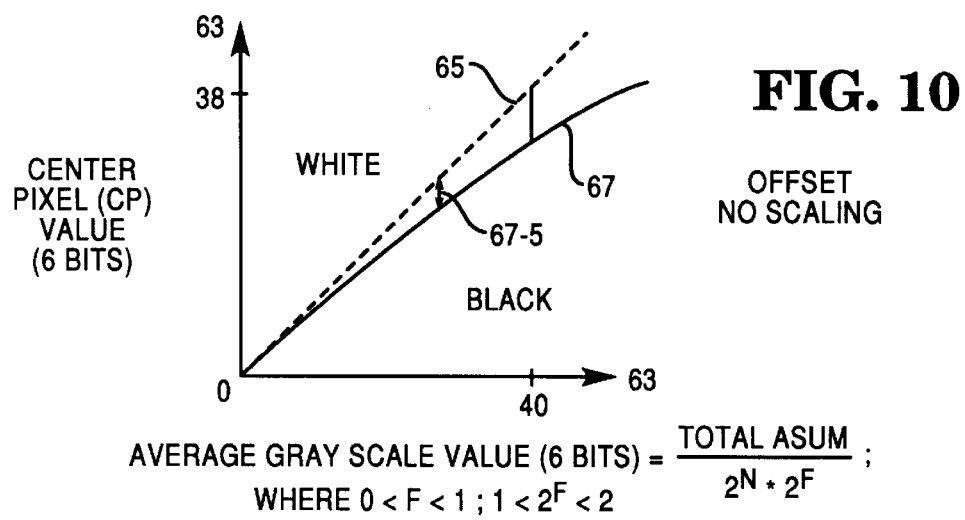
FIG. 10 OFFSET NO SCALING
AVERAGE GRAY SCALE VALUE (6 BITS) = $\dfrac{\text{TOTAL ASUM}}{2^N * 2^F}$ ; WHERE $0 < F < 1$ ; $1 < 2^F < 2$
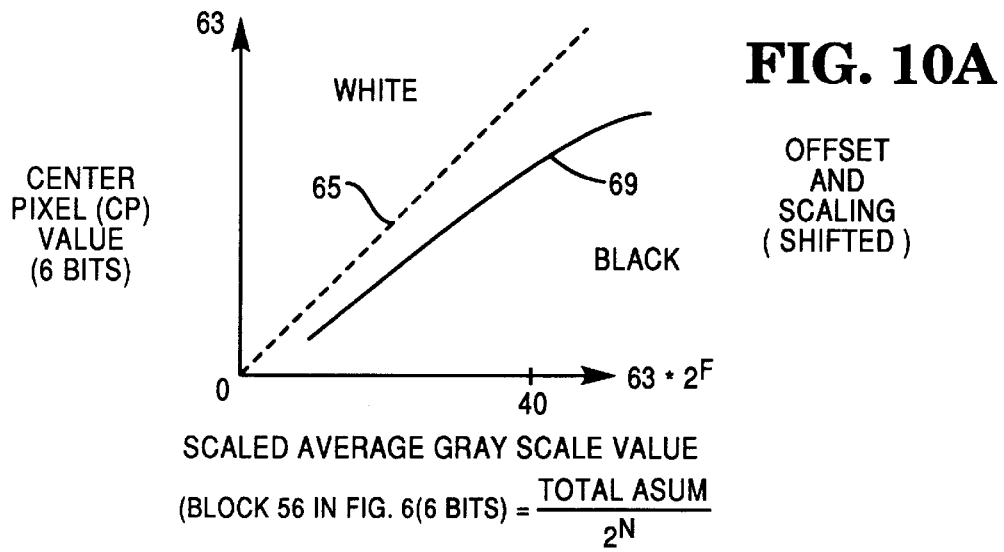
FIG. 10A OFFSET AND SCALING (SHIFTED)
SCALED AVERAGE GRAY SCALE VALUE (BLOCK 56 IN FIG. 6(6 BITS)) = $\dfrac{\text{TOTAL ASUM}}{2^N}$

FIG. 19

| ROW | COLUMN #1 | COLUMN #2 | COLUMN #3 | COLUMN #4 |
|---|---|---|---|---|
| #1 | 1 0 0 0 0 0 0 0 / 1 (178, 176, 180) | $V_R(3)$ | (7) | 0000011 |
| #2 | 0 1 0 0 0 0 0 0 / 1 | $V_R(2)$ | (6) | 000011 |
| #3 | 0 0 1 0 0 0 0 0 / 1 | $V_R(1)$ | (5) | 011 |
| #4 | 0 0 0 1 0 0 0 0 / 1 | $V(0)$ | (4) | 1 |
| #5 | 0 0 0 0 1 0 0 0 / 1 | $V_L(1)$ | (3) | 010 |
| #6 | 0 0 0 0 0 1 0 0 / 1 | $V_L(2)$ | (2) | 000010 |
| #7 | 0 0 0 0 0 0 1 0 / 1 | $V_L(3)$ | (1) | 0000010 |
| #8 | 1 0 0 0 0 0 0 X / 1 (222, 220) | H | | 001+<br>RUN LENGTH #1+<br>RUN LENGTH #2 |
| #9 | X X X 1 0 0 0 1 / 0 | P | | 0001 |

CHART #1

238

| BIT POSITION | | | | | | | |
|---|---|---|---|---|---|---|---|
| #7 | #6 | #5 | #4 | #3 | #2 | #1 | #0 |
| 1 | 1 | 1 | 0 | 1 | 0 | 1 | X |

BIT #7 | BITS #5,6 | BIT #4 | BITS #1-3

METHOD AND SYSTEM FOR COMPRESSING DATA IN A MULTI-CHANNEL IMAGE PROCESSING SYSTEM

This is a continuation of application Ser. No. 07/770,794, filed Oct. 3, 1991 now abandoned.

CROSS-REFERENCE TO RELATED APPLICATIONS 1. (Ser. No. 07/772,893filed Oct. 3, 1991, abandoned, in favor of Continuation application Ser. No. 08/192,937) for a Method And Modular System For High Speed Processing Of Item Images by Wayne M. Doran et al.

2. (Ser. No. 07/770,793) for a Method For Splitting And Configuring A Multi-Channel Image Processing System by Charles K. Pope filed Oct. 3, 1991, now U.S. Pat. No. 5,390,262.

3. (Ser. No. 07/770,792, now abandoned) for a Method And Apparatus For Thresholding And Configuring A Multi-Channel Image Processing System by Charles K. Pope filed Oct. 3, 1991.

BACKGROUND OF THE INVENTION

This invention relates to a method and system for processing image data from an item, like a document, for example, and also for producing a compressed, binarized version of the image data for transmission to or use by subsequent users. In particular, it relates to a method and system for compressing data in a multi-channel image processing system.

In some financial systems, for example, documents, like checks and deposit slips, are scanned by an imager as the documents are moved along a document track by a document transport means. In general, the imager scans along a single scanning line as the document is moved past the imager. With this system, there may be 640 "pixels" or picture elements, for example, in a single scan, depending upon the size and resolution requirements of the system.

A pixel represents image data coming from a portion of the document at the scanning line. The pixel coming from the scanning line is generally an analog signal; however, it is converted, typically, to an eight bit byte of data by an analog/digital converter for further processing by the system. Successive scans of data are obtained as the document is moved past the imager.

The pixel data coming from imaging a document, as described, may be used, for example, to generate an image of the document on a video display or CRT. When so displayed, an operator viewing the image may perform data completion, for example, by entering the monetary amount, etc. (associated with the document) on a keyboard which is part of the financial system.

In recent years, efforts have been made to increase the throughput of documents by reducing the time required to process the image data.

SUMMARY OF THE INVENTION

The present invention is similarly related to reducing the time required to process image data. While the discussion of the invention may proceed with regard to a financial system for ease of explanation, it is apparent that this invention may be used, generally, where image data is to be processed, as, for example, in facsimile transmission.

One of the features of the present invention is that it provides an architecture which facilitates parallel processing of image data or pixels received from a scanning line. The parallel processing is effected by dividing the pixels at a scanning line into a plurality of processing channels.

The architecture mentioned supports direct migration from low to high speed applications by simply adding more processing channels in parallel.

Varying pixel densities at the scanning line, and varying item sizes to be scanned can be accommodated by adding more processing channels or by adding more memory space to a single processing channel.

Currently available imaging devices have one, two, four, and eight output channels, for example. The architecture of the present invention enables the number of output channels from the particular imaging device selected to be used in the system to be independent of the number of parallel processing channels used in the system. In other words, an imaging device having two output channels may be used in a system employing four processing channels.

The architecture of the present system permits the pixel data derived from a scanning line to be processed without intermediate storage, and it also permits identical processors to be used in the processing channels.

Another feature of this invention is that it is able to receive an input of 80,000,000 pixels per second, process them, and deliver them in a format which conforms to the CCITT compression algorithm. The input stated is a function of current technology, and it could be higher in the future.

While this invention is discussed in relation to compression of binarized data, the concepts discussed herein could also be applied to gray scale compression.

This invention relates to a method and system for compressing data in a multi-channel image processing system.

In a first aspect of this invention, there is provided a method of compressing data comprising the steps:

(a) receiving successive columns of binary pixels representing data on a document;

(b) using an examining window to extend over a predetermined number of said successive columns along a direction which is perpendicular to the direction of said columns so as to present a row of pixels;

(c) generating a change of color bit for each of the pixels in the examining window;

(d) examining a pixel under consideration in said window with regard to a reference row and designating coding according to a predetermined code like CCITT; and (e) repeating steps (b), (c), and (d) for the remaining columns of binary pixels on the document.

In another aspect of the invention, there is provided a method of packing compressed data into a packed word having a predetermined number of bits therein so as to maximize addressing and storing of said compressed data, said compressed data being received in a serial manner and in code words having lengths of a varying number of bits, said method comprising the steps:

(a) receiving a said code word to be packed;

(b) determining a number of valid bits in the code word being examined, with the number of valid bits equalling the number of bits in the associated code word;

(c) storing the code word from step (a) and the associated number of valid bits from step (b) in a memory when the number of valid bits is less than said predetermined number so as accumulate a partially packed code word along with an associated cumulative number of valid bits which is less than said predetermined number;

(d) repeating steps (a), (b), and (c) as needed until the associated cumulative number of valid bits from step (c) when added to the number of valid bits from step (b) is at least equal to said predetermined number, with that number of valid bits needed to equal said predetermined number in step (d) referred to as needed valid bits, and any number of valid bits above said needed valid bits referred to as excess valid bits;

(e) combining the partially packed code word from memory with that portion of the code word associated with the needed valid bits from step (d) to accumulate a said packed word;

(f) outputting said packed word from step (e); and (g) storing any said excess valid bits and their associated code word bits in said memory.

In yet another aspect of this invention, there is provided a system for compressing data comprising:

means for receiving successive columns of binary pixels representing data on a document;

examining means including an examining window to extend over a predetermined number of said successive columns along a direction which is perpendicular to the direction of said columns so as to present a row of pixels; and means for generating a change of color bit for each of the pixels in the examining window;

said examining means being effective to examine a pixel under consideration in said window with regard to a reference row and to designate coding according to a predetermined code like CCITT.

The above advantages and others will be more readily understood in connection with the following description, claims, and drawing.

BRIEF DESCRIPTION OF THE DRAWING

FIG. 8A is a schematic diagram showing certain data queues associated with the processing of data from an examining window;

FIG. 8B is a schematic diagram showing a row sum queue associated with the processing of data from an examining window;

FIG. 8C is a schematic diagram showing a second row sum queue associated with the processing of data from an examining window;

FIG. 9 is a graph showing the parameters of a look-up table used in thresholding;

FIG. 10 is a graph showing the use of adjusted gray scale values in thresholding;

FIG. 10A is a graph showing offset and scaling features included in the look-up table shown in FIG. 6;

FIG. 19 is a chart showing various codes for different coding situations;

DETAILED DESCRIPTION OF THE PREFERRED EMBODIMENTS

Figure 1:
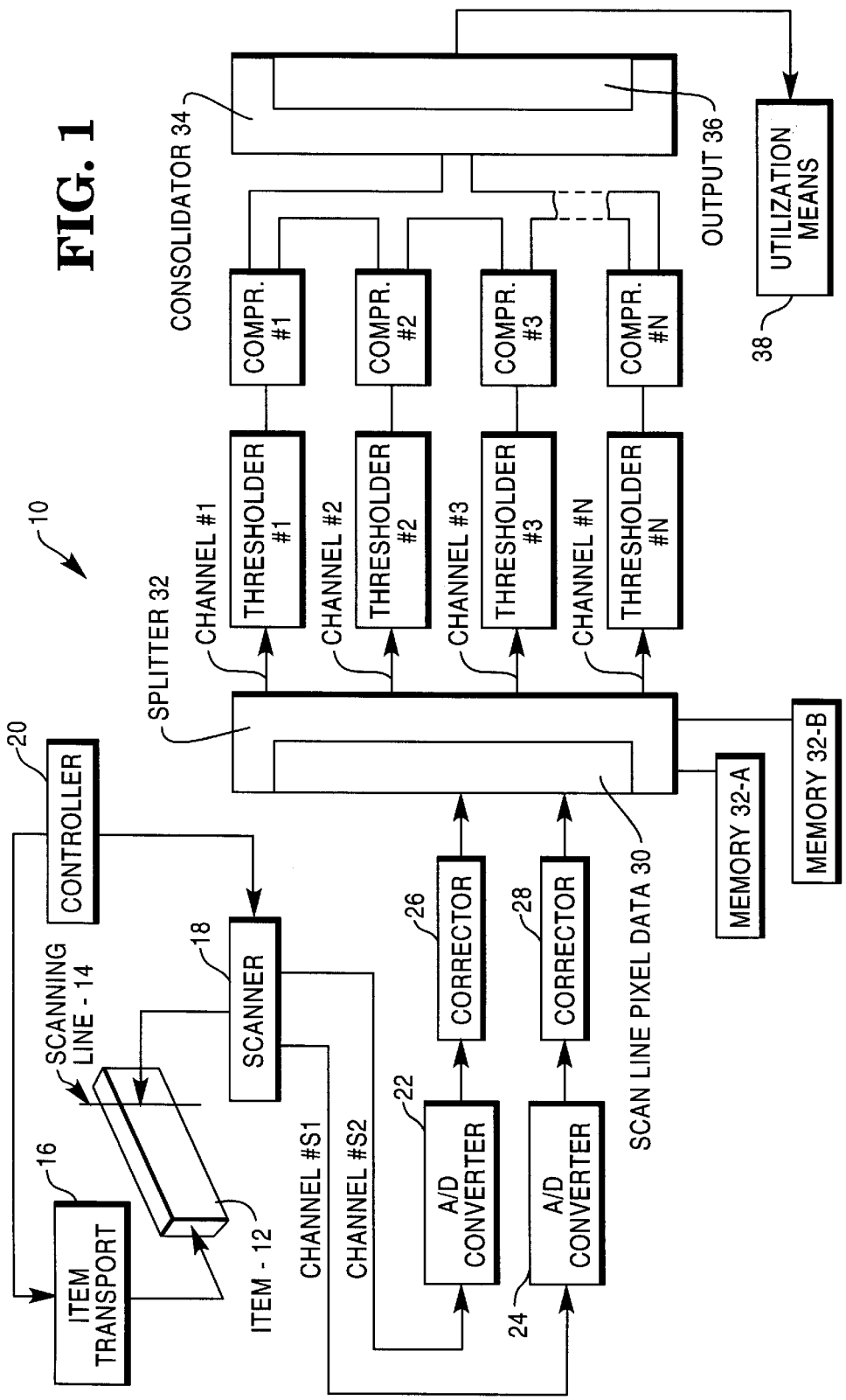
FIG. 1 is a general schematic diagram, in block form, of a preferred embodiment of a system made according to this invention.

FIG. 1 is a general schematic diagram, in block form, of a preferred embodiment of the system 10 made according to this invention. As stated earlier herein, the system 10 may be used, generally, wherever images of items are to be processed. For example, the images may be associated with facsimile transmission or the images may be associated with processing financial documents within a financial environment, to name just two general areas of application. For convenience, this invention will be illustrated with regard to the processing of documents.

When the imaging of items is to be effected, relative motion is provided between the item to be imaged and the imager or scanner. To simplify the discussion, the item 12 (which may be a document) is moved to an area referred to as a scanning line 14 by a conventional item transport 16 so as to bring the area to be imaged into operative relationship with a conventional imager or scanner 18. The scanner 18 includes all the necessary lighting, focussing systems, and sensors for obtaining pixel data about that portion of the item 12 which is positioned at the scanning line 14. A pixel is a picture element covering a generally square area of the document at the scanning line. There may be several hundred pixels obtained at the scanning line 14 depending upon the resolution requirements of the system 10 and the size of the documents to be imaged. After a scanning line of pixel data is obtained, the item transport 16 moves the item 12 so as to present a new area of the item 12 to obtain the next scanning line of pixel data. This process is repeated until the entire item is scanned. A suitable controller 20 is used to conventionally control the item transport 16 and the scanner 18 with suitable control signals and clocks.

The scanner 18 (FIG. 1) may be a conventional charge coupled device (CCD) scanner which includes a buffer (not shown) for each pixel of data obtained from the scanning line 14, with each buffer storing the analog value of the associated pixel. These CCD scanners are offered in a plurality of output channels, such as one, two, four, or eight or more output channels, for example. The particular scanner shown in FIG. 1 contains two output channels, namely channel #S1 and channel #S2. A first clock is used by the scanner 18 to output (over channel #S1) the analog value (stored in the associated buffer) of the first pixel from the scanning line 14; a second clock is used to output (over channel #S2) the analog value of the second pixel (stored in the associated buffer) in the scanning line 14; and, a first clock is used to output the analog value of the third pixel over channel #S1. This process is repeated until all the pixels associated with a scan line of data are outputted from the scanner 18. Successive scan lines of pixels are processed in the same manner.

As the analog data from the scanner 18 is outputted over channels #S1 and #S2 as described, the analog value of each pixel is converted to a six bit value of binary data by the analog/digital (A/D) converters 22 and 24, respectively. Each pixel of data represents one of 64 "shades" of gray, ranging from completely white to completely black, with each pixel of data being derived from the analog value of the associated pixel. These pixels or outputs of the A/D converters 22 and 24 are fed into correctors 26 and 28.

The function of the correctors 26 and 28 is to take the pixels as received, and balance them out according to different parameters. For example, the correctors 26 and 28 correct for differences in illumination which may occur at different portions of the scanning line 14. Generally, the light intensity illuminating the scanning line is greater at the center of the scanning line 14 than the intensity at the extremities of the scanning line 14. The correctors 26 and 28 also compensate for pixel sensitivity and other disturbances in the scanning process; these aspects will be covered in more detail hereinafter. As part of the correction process, each eight bit byte of pixel data is reduced to a six bit byte by simply retaining only the six most significant bits and dropping the two least significant bits. The correctors 26 and 28 also output their data so that the pixel data appears as a scan line of pixel data 30 when it is forwarded to the splitter 32.

The function of the splitter 32 is to take the scan line of pixel data 30 and to divide it into a plurality of individual processing channels which are processed in parallel. Naturally, the number of processing channels selected can be varied, and the number also depends upon a particular application. In the embodiment described, the number of processing channels shown is four, namely channel #1, channel #2, channel #3, and channel #N. Each of the processing channels just mentioned is identical in construction and receives an equal portion of the scan line of pixel data 30. For example, if the scanning line 14 contains 900 pixels, there would be 900 pixels of pixel data at the scan line 30, and accordingly, there would be 225 such pixels (excluding overlap pixels) being processed by each of the channels #1, #2, #3, and #N. By processing the scan line of pixel data 30 in parallel, the throughput of data can be greatly increased over single channel processing.

In a second embodiment, the goal of the splitter 33 shown in FIG. 26, for example, is to make each channel receive an equal number of pixels, including the overlaps. This aspect will become clearer during a discussion of FIG. 26.

Each of the processing channels #1, #2, #3, and #N contains a thresholder and a compressor. For example, channel #1 contains thresholder #1 and compressor #1, and correspondingly, channel #N contains thresholder #N and compressor #N. Because all the channels #1, #2, #3, and #N are identical, only a discussion of channel #1 will be given.

With regard to channel #1 (FIG. 1), the general function of the thresholder #1 is to reduce each six bit byte of pixel data included in the portion of the scan line of pixel data 30 assigned to it by the splitter 32 into a single binary bit. For example, a binary 0 may indicate a white pixel, and a binary 1 then would indicate a black pixel. To perform the thresholding operation, an "examining window" is used. The particular six bit byte of pixel data to be thresholded is positioned in the center of the examining window which may include, for example, a 3×3 matrix of pixel data from adjacent rows and columns of pixel data. The center pixel under consideration is then compared with the surrounding pixels in the examining window to decide whether the center pixel is to be made a binary 0 or a binary 1. This aspect will be discussed in more detail hereinafter.

The black and white pixels coming from the thresholder #1 for the portion of the scan line of pixel data 30 assigned to channel #1 are then compressed by the compressor #1. In the embodiment described, the compression technique utilized is referred to as CCITT Group 4 which is a standard technique used in facsimile transmission, for example.

Compressors #2, #3, and #N perform similar compression of data on their respective portions of the scan line of data assigned to them by the splitter 32. The outputs of each of the compressors #1, #2, #3, and #N are fed into a consolidator 34 shown in FIG. 1. The function of the consolidator 34 is to take the compressed data from the compressors just mentioned and to consolidate or to concatenate the compressed data for all the zones. This aspect will be discussed later herein. The output 36 of the consolidator 34 is then forwarded to a utilization means 38. The utilization means 38 may be a MODEM, for example, for transmission to a receiver, or it may be part of a financial system which utilizes the compressed data for further processing or displaying, for example. Naturally, the compressed data from the consolidator 34 has to be decompressed before it is converted into a binarized image of what was seen at the scanning line 14.

One of the features of the present invention is that while the parallel processing is effected by the plurality of channels #1–#N mentioned with regard to FIG. 1, there are no "seams" produced between adjacent channels #1–#N at the output 36 of the consolidator 34. A "seam" as used herein means possibly incorrect pixel data near the boundaries of adjacent channels #1–#N, with the incorrect pixel data being due to incorrect thresholding, for example. A "seam" in the pixel data could be detrimental in the processing of financial documents, for example, because the seam may occur at an area of the document where the monetary amount on the document, like a check, for example, appears.

Figures 2A, 2B, 2C:
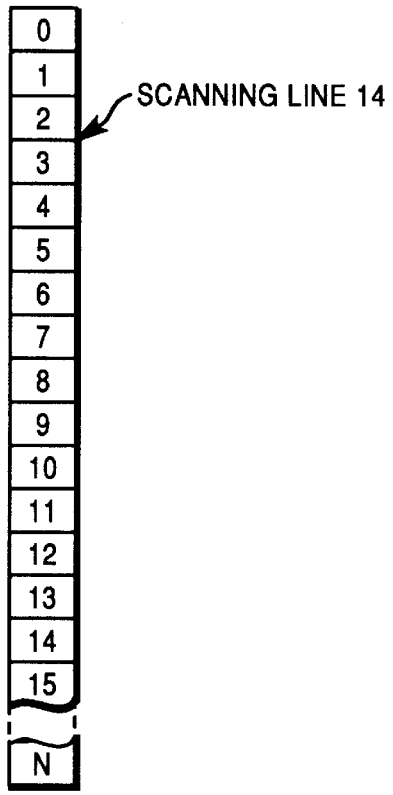
FIGS. 2A, 2B, and 2C are schematic diagrams which show certain relationships between the scanning line and the channels associated with the scanner shown in FIG. 1.

In order to explain how the seams are avoided, it is useful to explain, generally, how the splitter 32 performs its function. In this regard, FIGS. 2A, 2B, and 2C are schematic diagrams which show certain relationships between the scanning line 14 and the channels associated with the scanner 18. When the scanner 18 has 2 channels as shown in FIG. 1, the individual pixels of the scanning line 14 are divided between the channels #S1 and #S2 as shown in FIG. 2B. When the system 10 employs a scanner 18-1 (like 18) which has four channels, the individual pixels of the scanning line 14 will be divided among the channels #R1–#R4 as shown in FIG. 2C. It should be recalled that after processing by the A/D converters 22 and 24, and the correctors 26 and 28, the outputs from the channels #S1 and #S2 are combined to produce the scan line of pixel data 30 as shown in FIG. 1. Similarly, when four channels #R1–#R4 are used in a scanner 18-1 (FIG. 2C), the outputs are similarly combined to produce the scan line of pixel data 30. The order of pixel data in the scan line 30 (at the splitter 32) corresponds to that of the scanning line 14 shown in FIG. 2A; however, in some situations, pixel sequence conversion may be necessary. While the scanning line 14 is shown as proceeding from the top to the bottom, in some applications it is advantageous to have the scanning proceed from the bottom of a document to the top thereof, as for example, when this invention is used with financial documents such as checks and deposit slips. These documents come in varying widths, but they all are positioned at the bottom of a track when being moved past the scanner 18. If the maximum height of a document at the scanning line 14 is four inches and some of the documents are only three inches high, it means that there will be useless information at the top of the scanning line 14. Proceeding from the bottom of the scanning line 14 for such an application enables one to eliminate the top one inch of image data (in the example being described) when displaying an image derived from the scanning line 14, for example. The background at the scanning line 14 is black so that when a document 12 appears at the scanning line 14, the change in color can be used to indicate the start of a document and where valuable data starts. For ease of illustration, the discussion hereinafter will proceed with the actual scanning starting at the top of the scanning line 14 and ending at the bottom thereof.

Figure 3:
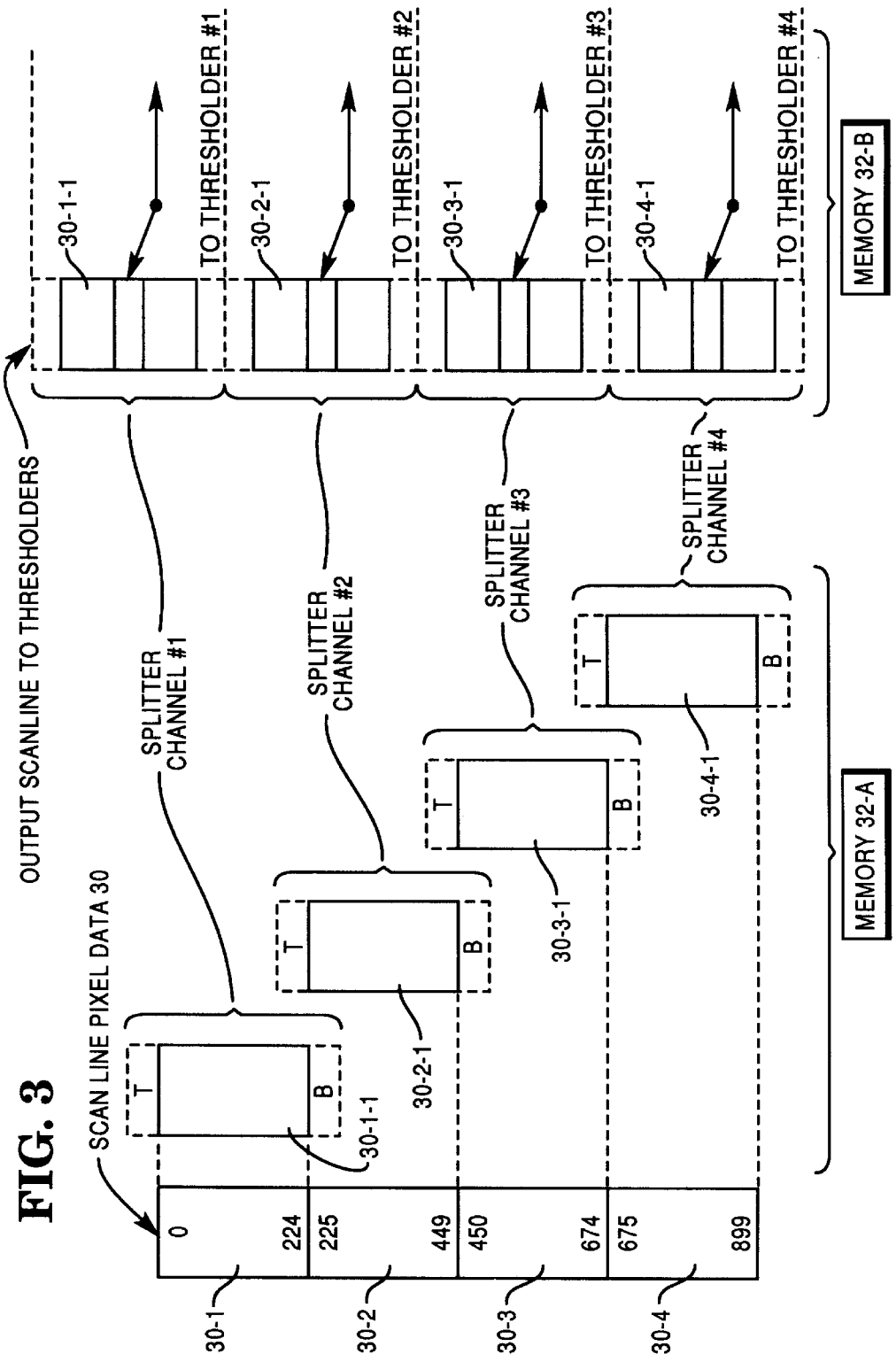
FIG. 3 is a schematic diagram showing how a scan line of pixel data is divided into separate channels by the splitter shown in FIG. 1.

The scan line of pixel data 30 is divided (by the splitter 32) into the channels #1–#4 as shown in FIG. 3. While four channels are described in relation to FIG. 3, it should be understood that the number could be changed to accommodate different applications. For the application being discussed, assume that there are 900 pixels in the scan line of pixel data 30. Each channel to be created should have an equal number of pixels therein, and accordingly, there would be 225 pixels in each of the four channels 30-1 through 30-4. In addition to dividing the scan line of pixel data 30 as described, a predetermined number of "adjacent" pixels is added to each of the channels 30-1 through 30-4 as follows. If one is the predetermined number, there would be one pixel added to the top of channel 30-1 and one pixel would be added to the bottom of this channel to generate the zone 30-1-1 shown in FIG. 3. The terms "top" and "bottom" of each zone relate to how they are located in FIG. 3. The adjacent top pixel "T" for channel 30-1-1 comes from the top border of the scan line of pixel data 30, and the bottom pixel B of this zone comes from the top pixel of channel 30-2; in the embodiment described, the top pixel "T" is put in by the splitter 32, itself, and is a binary 0 or white pixel. Correspondingly, the top pixel T of zone 30-2-1 comes from the bottom pixel of zone 30-1 while the bottom pixel B of zone 30-2-1 comes from the top pixel of zone 30-3. The remaining zones 30-3-1 and 30-4-1 are similarly constructed with the bottom pixel B of zone 30-4-1 coming from the bottom border of the scan line of pixel data 30; in the embodiment described, this bottom pixel B (a binary 0) is put in by the splitter 32, itself. The predetermined number of adjacent pixels added, as described, is dependent upon the particular thresholding scheme utilized; this aspect will be discussed in more detail hereinafter. The pixels are shown, obviously, in greatly enlarged size in FIG. 3 to facilitate a showing thereof.

The zones 30-1-1, 30-2-1, and 30-3-1 just described in relation to FIG. 3 become the channels #1 through #3, respectively, coming from the splitter 32 shown in FIG. 1, with channel #4 shown in FIG. 3 corresponding to channel #N shown in FIG. 1. The pixel data coming from the channel #1 in FIG. 3 is processed by the thresholder #1 and the compressor #1, and similarly, the pixel data coming from channels #2, #3, and #4 are handled by the combination of thresholder #2 and compressor #2, the combination of thresholder #3 and compressor #3, and the combination of thresholder #4 and compressor #4, respectively, to process the the scan line of pixel data 30 in parallel. The output from the combination of thresholder #1 and compressor #1 is fed into the consolidator 34 shown in FIG. 1 as previously described; the same is true for the combinations of thresholders and compressors #2 through #4 discussed in this paragraph.

The various zones and channels just described with regard to FIG. 3 are used in thresholding the six bit byte of data for each pixel in the scan line of pixel data 30 to reduce it to a binary 0 "white" or a binary 1 representing data or "black". Before discussing the thresholding operation in detail, it appears useful to describe the operation only generally. In this regard, the thresholding for each channel #1–#4 is performed by its associated thresholder #1–#4, respectively. The thresholding operation is performed by comparing the pixel to be thresholded with the surrounding pixels. To perform the comparison, an examining window is used.

Figure 4:
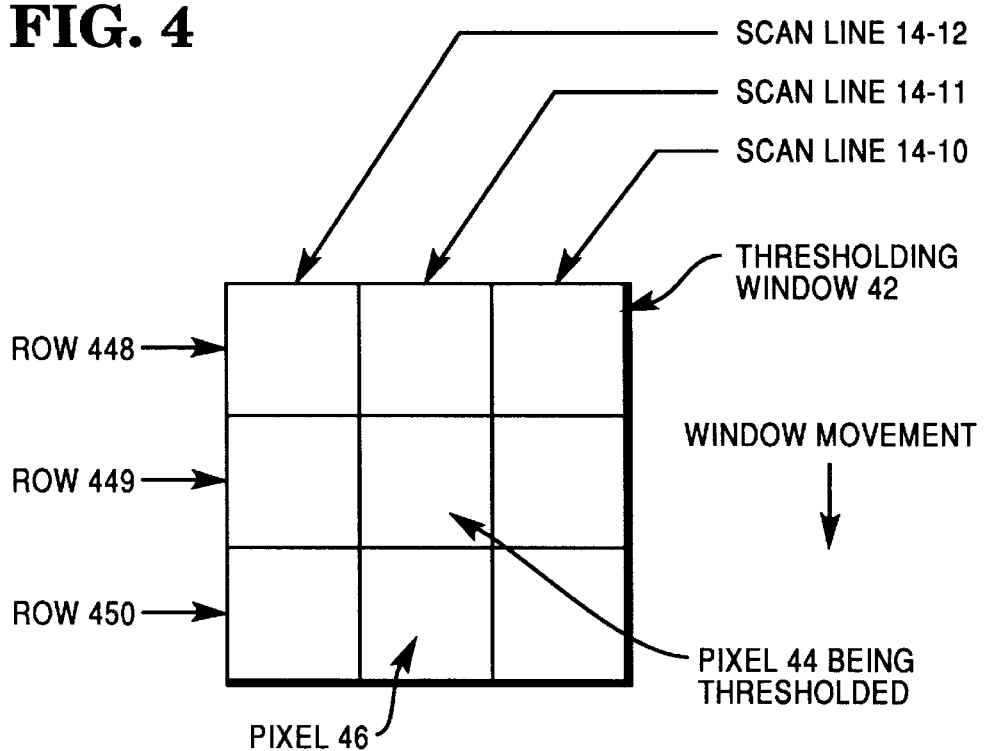
FIG. 4 is a schematic diagram of an examining window used for thresholding the pixel data.

A simplified examining or thresholding window 42 is shown in FIG. 4. In its simplest state, the examining window contains a matrix of nine pixels, with the pixel 44 to be thresholded being located in the center of the examining window 42. As an illustration, assume that the examining window 42 is positioned to cover the pixels coming from scan lines 14-10, 14-11, and 14-12, and rows 448, 449, and 450; these are the rows associated with the processing being performed by the thresholder #2 with regard to channel #2. The pixel in row 449 will also be used in the processing being performed by channel #3 in that it becomes the top pixel "T" for channel #3. The number of pixels in the scan line pixel data 30 is 900 as discussed earlier herein, with row 449 corresponding to the lowermost pixel in channel 30-2 (FIG. 3) in the example being described. Assume that pixel 44 (FIG. 4) is the last or lowermost pixel (row 449) in the channel 30-2 (FIG. 3) occurring in the scan line 14-11. Pixel 46 in the examining window 42 corresponds to the bottom pixel B in the zone 30-2-1 which is actually splitter channel #2. A point to be made here is that it is only the pixels in the zones like 30-1 and 30-2 that are thresholded. The pixels like T and B which are included in the zone 30-1-1 in FIG. 3 are used in the process of thresholding those pixels within the channel 30-1, but they are not actually thresholded as a part of channel 30-1; the pixels T and B may be considered as the overlap pixels. Notice also, that the bottommost pixel B in the zone 30-2-1 corresponds to the topmost pixel (row 450 in the example being described) of channel 30-3. This means that the pixel 46 (FIG. 4) coming from channel 30-3 is also used in thresholding the pixel 44 coming from the channel 30-2 when the processing associated with channel #2 is performed. This slight overlapping of pixels associated with different zones is what prevents the "seams" or incorrect thresholding between adjacent channels when parallel processing is performed. This is a feature of the present invention. While only one pixel, like B or T, is shown in the overlapping zones for ease of illustration, there may be more than one pixel in the overlapping zones.

Figure 5:
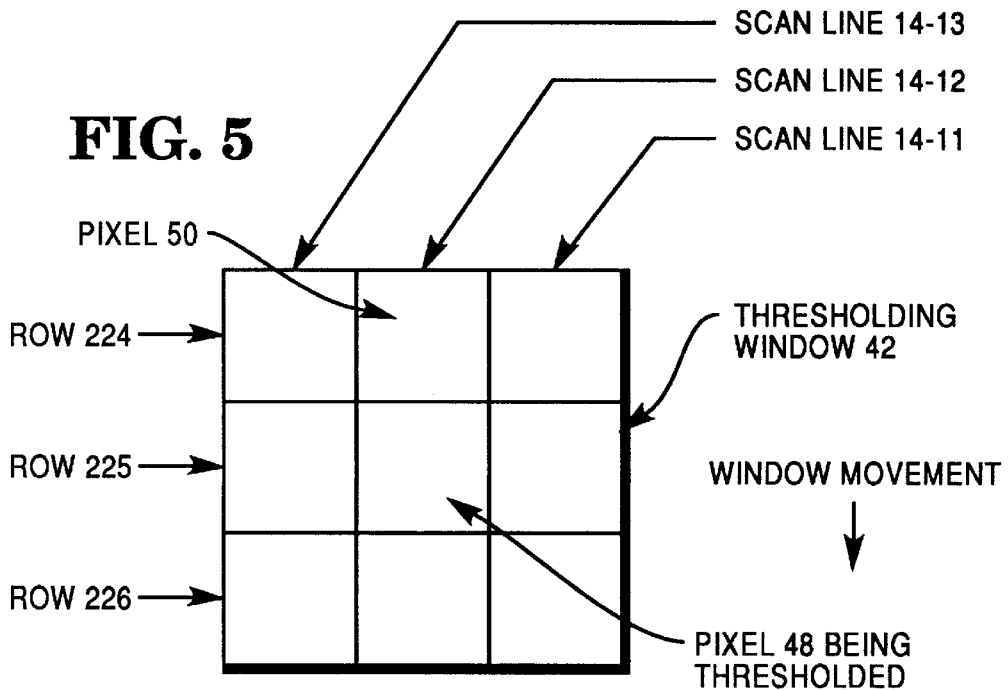
FIG. 5 is a schematic diagram showing the examining window in a different location from that shown in FIG. 4.

After the center pixel 44 to be thresholded is thresholded to a binary 1 or binary 0, the examining window 42, in the example being described, is moved downwardly, one row at a time, to repeat the process for the remaining pixels in scan line 14-11 in the example being described. The bottom pixel B used in the processing of the pixel in scan row #899 is a binary 0 as previously discussed and is entered as "border" data as previously discussed. After reaching the bottom of a scan, the thresholding window 42 is moved upwardly and to the left, for example, as viewed in FIG. 4. The column of pixels to be thresholded then becomes scan line 14-12. The pixel in Row 0 and scan line 14-12 becomes the first pixel to be thresholded with the top pixel T associated with zone 30-1-1 (FIG. 3) being a binary 0 to represent the top border of the document 14. After processing as described, the thresholding window 42 will be moved downwardly (as viewed in FIG. 5) so that the pixel 48 becomes the next pixel to be thresholded in the example being described. Notice that pixel 48 is located in scan line 14-12 and row 225, with scan row 225 being the topmost row in channel 30-2. When the thresholding window 42 is positioned as shown in FIG. 5, the center pixel 48 to be thresholded is compared with the surrounding pixels which include the pixel 50 which corresponds to lowermost pixel in channel 30-1 (FIG. 5). By this technique, the image processor 40-2 associated with the splitter channel #2 is able to use the pixel 50 to eliminate any seam which might occur between the channels 30-1 and 30-2 shown in FIG. 3.

Notice from FIGS. 4 and 5 that as the examining window 42 is moved to the left, data or pixels associated with scan line 14-10 are dropped off and data or pixels associated with scan line 14-13 are picked up. The scan lines, like 14-10 and 14-11 for example, represent successive scan lines of data coming from the scanning line 14 shown in FIG. 1. Moving the thresholding window 42 to the left, as described herein, is analogous to examining successive scan lines as the item 12 is moved to the right (as viewed in FIG. 1) relative to the scanning line 14.

The thresholding window 42 has a physical size which is approximately a one eighth inch square in the embodiment described. This size was experimentally determined to provide for optimum performance by the thresholders #1–#4. The number of pixels which is included in the thresholding window 42 is dependent upon the pixel density or the resolution afforded by the scanner 18. For example, if the scanner provides a resolution of 200 pixels per inch, a thresholding window 42 which is to cover a one eighth inch square at the scanning line 14 would include 25 pixels as measured along the scanning line. Naturally, in another application like imaging 8½×11 inch documents, the window size may be larger. The window size may also be larger when imaging the back of an item 12 like a check when compared to the front of a check which contains important account and monetary data, for example.

Figure 6:
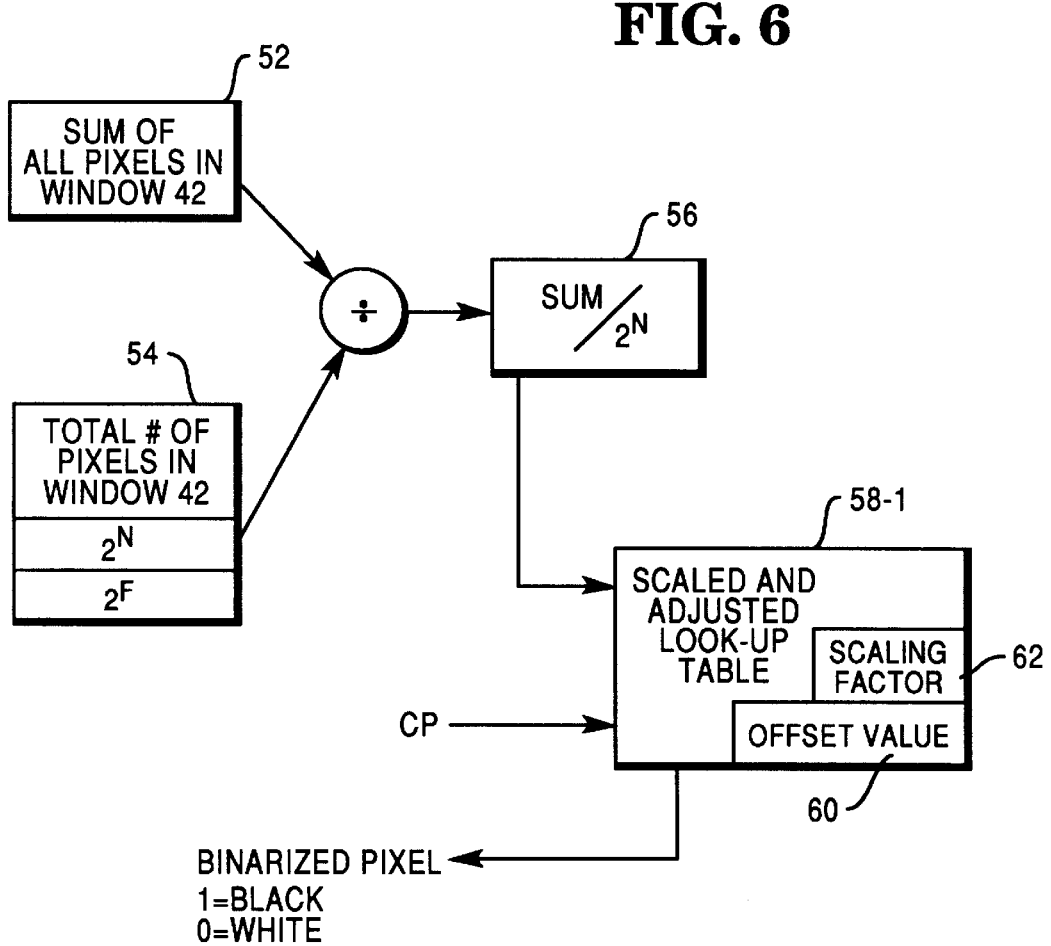
FIG. 6 is a schematic diagram showing how the thresholding is effected within the examining window.

The particular method of thresholding used with the thresholding window 42 (FIGS. 4 and 5) can be explained best in relation to FIG. 6. In this regard, it should be recalled that each of the individual pixels in the window 42 represents six bits of data (gray scale value) in the example being described. When the examining window is positioned over the pixels to be evaluated, the center pixel (CP), like pixel 44 in FIG. 4, is the pixel to be thresholded.

The first step in the thresholding procedure is to obtain a sum of all the gray scale values of the pixels within the window 42 as shown by the block 52 in FIG. 6; this sum also includes the center pixel. The next step is to obtain the number of pixels in window 42 as shown by block 54. In the embodiment described, there are 625 pixels within the window 42. The 625 pixels can be broken up into elements of $2^N$ and $2^F$, with the former term equal to 512 (when N=9). The term $2^F$ is incorporated in the look-up table 58-1 as a scaling factor 62 as will be described later herein in connection with Equation EQ. 11 and FIGS. 15 and 15A. In the embodiment described, $2^F$ is a value which is greater than one but less than two, with F being greater than zero but less than 1. For example, in the embodiment described, the scaling factor 62 is equal to 625 divided by 512. For the moment, it is sufficient to state that when the sum of all gray scale values of the pixels in the window 42 is divided by the term equal to $2^N$ as shown by block 56, that resulting value is used as an address along with the center pixel CP under consideration to the look-up table 58-1. The output of the look-up table 58-1 becomes the thresholded or binarized pixel as shown in FIG. 6. When designing the look-up table 58, an offset value (shown as block 60) is added to the value shown in block 56 to arrive at a scaled and adjusted gray scale level included in look-up table 58-1. The values from block 56 (gray level-six bits) and the center pixel CP (six bits) are then used as addresses to the look-up table 58-1 to threshold the center pixel CP into a binary one or a binary zero. In other words, the offset value 60 is already incorporated in the look-up table 58-1 and does not require a separate look-up operation in the look-up table 58-1 itself. This aspect will be explained in more detail in connection with Equation EQ. 11 as alluded to earlier herein.

FIG. 9 shows a graph for the parameters of a look-up table which does not have any offset value 60 as discussed in relation to FIG. 6, and consequently, the thresholding line 65 might look like that shown in FIG. 9. With regard to FIG. 9, the gray scale value (block 56 in FIG. 6) is used as one six bit address, and the center pixel value (CP) is used as the other six bit address to determine whether the center pixel (CP) will be thresholded as a binary 1 or a binary 0. There is no offset value associated with the thresholding line 65 shown in FIG. 9. Also, there is no scaling factor associated with the thresholding line 65; this occurs when the thresholding window, like 42, contains a number of pixels which is not a whole multiple of 2 raised to a whole number. When the window 42 contains 625 pixels as described, a scaling factor is needed. Continuing with FIG. 9, any center pixel value located above the thresholding line 65 is thresholded as a white pixel, and any center pixel value located below the thresholding line 65 is thresholded as a black pixel.

The offset value 60 alluded to with regard to FIG. 6 is determined experimentally by taking into consideration the characteristics of the scanner 18 used, the lighting on the scanning line 14, the type of documents being read, for example, and what kind of thresholding is expected from the system 10. For the moment, it is sufficient to state that the offset value is derived experimentally, and it tends to offset the thresholding line 65 shown in FIG. 9.

FIG. 10 is analogous to FIG. 9 just discussed; however, curve 67 represents the thresholding line which reflects the offset value 60 (FIG. 6). In effect, the look-up table 58-1 contains offset and adjusted or scaled gray scale values, while the gray scale value (block 56—six bits) and the center pixel CP (six bits) are used as an address to threshold the center pixel. In qualitative terms, the offset values are used to suppress certain background information on the document, for example. FIG. 10 includes a thresholding line 67 which is displaced from the thresholding line 65 shown in dashed outline so as to reflect the adjustment mentioned herein.

Figure 11:
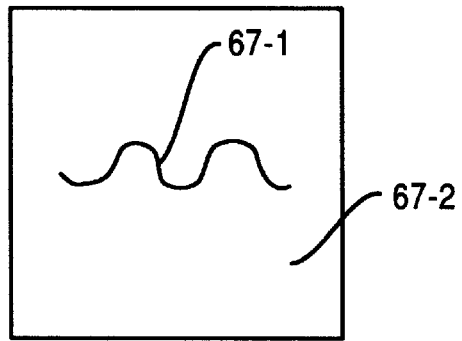
FIG. 11 is a diagram representing one situation in thresholding.
Figure 12:
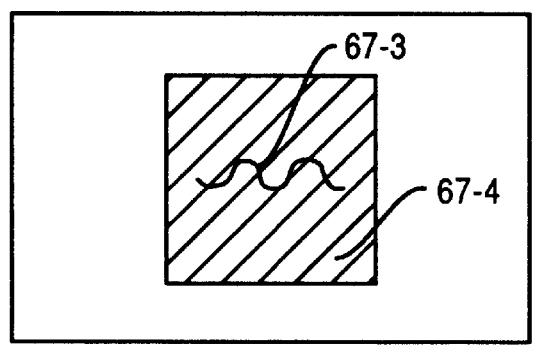
FIG. 12 is a diagram representing another situation in thresholding.

To illustrate how thresholding takes place, two fictional examples will be given. If the average gray scale value is 40 and the center pixel (CP) has a value of 38, the center pixel (CP) will be thresholded as a black pixel or binary 1 when using the thresholding line 65 shown in FIG. 9. If the gray scale value is 40 and the center pixel (CP) has a value of 38, the center pixel (CP) will be thresholded as a white pixel or binary 0 when using the thresholding line 67 shown in FIG. 10. In other words, as the background of a document gets lighter, a center pixel has to be considerably darker than the background in order to be thresholded as a black pixel or a binary 1; this is represented by a dark mark 67-1 on a white background 67-2 as shown in FIG. 11. As the background gets darker, a center pixel does not have to be too much darker than the associated background for the center pixel to be thresholded as a black pixel or a binary 1; this is represented by a dark mark 67-3 on a somewhat dark background 67-4. This latter situation relating to the dark background 67-4 is represented by the double arrow line 67-5 shown on FIG. 10. A point to be made here is that the values which appear in the look-up table 58-1 may be down loaded to suit particular applications.

FIG. 10A is a graph to approximate what is in the look-up table 58-1 shown in FIG. 6. To recapitulate, FIG. 9 contained no offset and no scaling. FIG. 10 contains an offset (like 60 in FIG. 6) but no scaling factor, and FIG. 10A contains both an offset 60 and a scaling factor 62 as discussed earlier in relation to FIG. 6. In effect, the scaling factor 62 tends to shift the curve 67 in FIG. 10 to the right as viewed in FIG. 10A. This is shown by having the X axis multiplied by $2^F$ in FIG. 10A.

Figure 7:
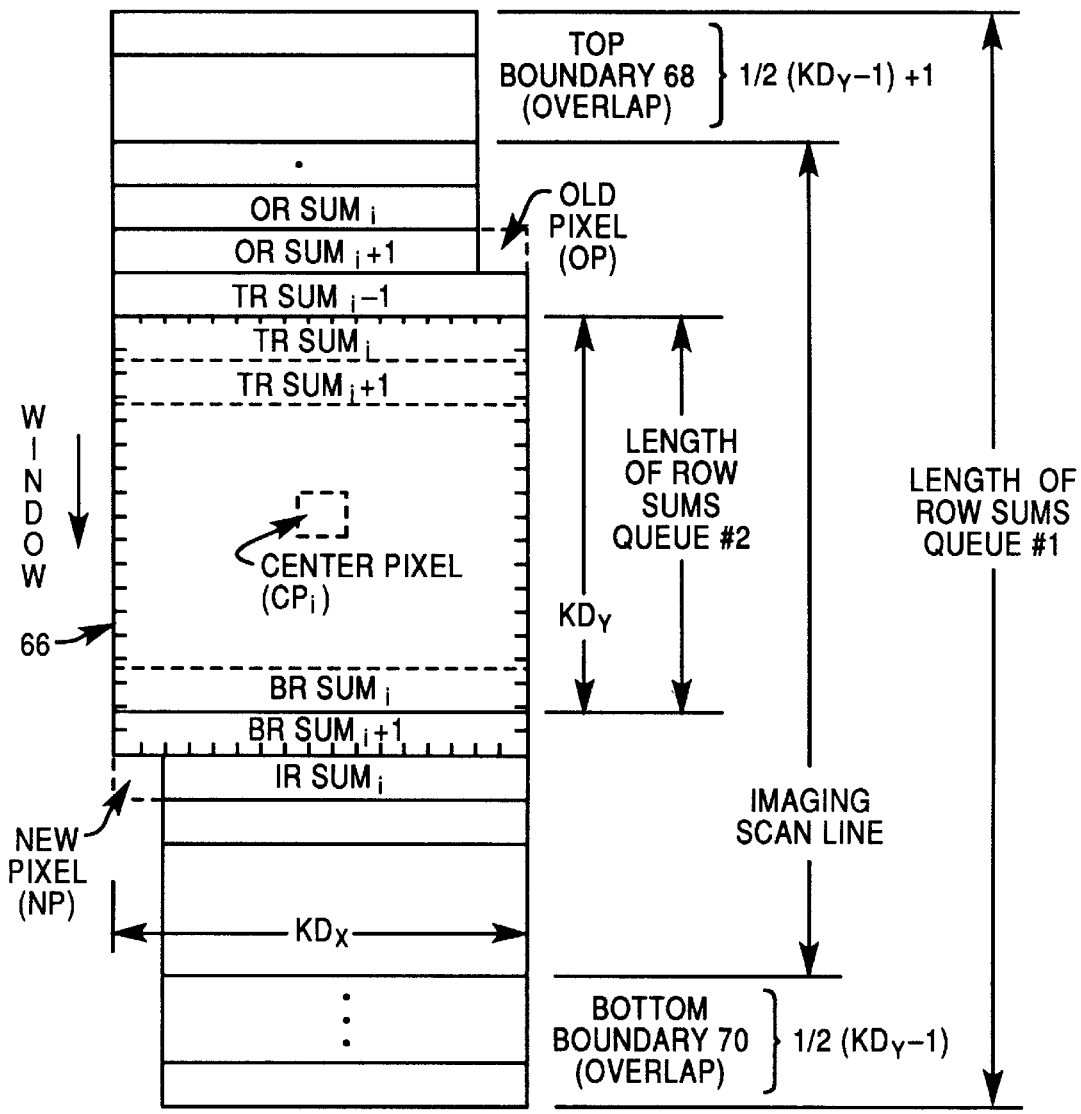
FIG. 7 is a schematic diagram showing certain parameters used in the thresholding process.

Continuing with the thresholding process, FIG. 7 is a schematic diagram (not drawn to scale) illustrating certain parameters used in the process. The examining window 66 has a height which is $KD_y$ and a width which is $KD_x$. As previously stated, one of the features of this invention is that the size of the examining window 66 can be configured to suit particular applications.

In the embodiment described, the examining window 66 (FIG. 7) has a height ($KD_y$) which is 25 pixels and a width ($KD_x$) which is also 25 pixels. $KD_y$ is equal to $KD_x$ to provide a square examining window. The top and bottom boundaries 68 and 70 (for the overlap mentioned earlier herein) are related to the size of the window 66 as follows. As shown in FIG. 7, there is a top boundary 68 and a bottom boundary 70. This means that for a window size of 25 pixels, there would be 13 rows of overlap at the top boundary 68, and there would be only 12 rows of overlap at the bottom boundary 70. The extra row of pixels at the top boundary 68 is needed as a reference line for the particular type of compression technique used in the compressors #1 through #N shown in FIG. 1. In other words, a reference line is needed prior to compressing a row of data, for example. A reference row is also needed for the top row in each zone, like row 225 (FIG. 3) for zone 30-2; this aspect will be discussed in detail hereinafter.

In continuing with a discussion of the thresholding technique discussed in relation to FIG. 7, it is useful to consider certain techniques used in association with the examining window. In this regard, FIG. 8A shows a memory queue #1 and a memory queue #2 used in association with the examining window 66. Memory queue #1 is referred to as the new pixel-center pixel (NP-CP) queue, and memory queue #2 is referred to as the center pixel-old pixel (CP-OP) queue. The memory queues #1 and #2 may be considered as circumferential memories with a predetermined number of stages therein. The stages are determined by parameters such as the maximum document height to be anticipated in the system 10, the resolution of the imager used, the number of channels being used for parallel processing, and the number of pixels in the examining window 66, for example. The number of pixels in the examining window 66 can be reflected by the dimensions of the window which can be stated as $KD_y=KD_x$. It is convenient to think of the NP-CP queue #1 as having a predetermined number of stages or pixels to enable a new pixel $NP_i$ (FIG. 7) to enter this queue and to be moved around the queue to reflect the movement of the examining window 66 as it processes successive columns of pixels. After a predetermined number of successive moves around the NP-CP queue #1, the center pixel $CP_i$ is outputted from the NP-CP queue #1 at the same time that a new pixel $NP_i$ enters this queue. The same center pixel $CP_i$ which is outputted from the NP-CP queue #1 is copied into the center pixel-old pixel (CP-OP) queue #2. After a predetermined number of moves around the CP-OP queue #2, this same center pixel $CP_i$ will become the old pixel $OP_i$ which is deleted from the examining window 66. The center pixel CP is extracted for the thresholding operation mentioned, and the new pixels NP and the old pixels OP are extracted to be used in the rows sums calculations associated with queues #1 and #2 shown in FIGS. 8B and 8C.

The relationships between the queues #1 and #2 shown in FIG. 8 can be stated as follows:

$$\text{Total pixel memory} = NP - CP \text{ queue } \#1 + \quad\quad (EQ.1)$$
$$CP - OP \text{ queue } \#2.$$

The channel thresholder height = (EQ. 2)

$$\frac{(\text{Max. Doc. Height}) \times (\text{resolution})}{\text{Number of channels}} + KD_y(\text{pixels}) + D_1$$

The lengths of the pixel queues #1 and #2 shown in FIG. 8 are as follows:

$$NP - CP = \frac{[KD_x - 1 \times CTH]}{2} + 4TRUNC\frac{[KD_y - 13]}{2}. \quad (EQ.3)$$

$$CP - OP = \frac{[KD_x - 1 \times CTH]}{2} + 4TRUNC\frac{[KD_y - 13]}{2}. \quad (EQ.4)$$

wherein: CTH = Channel thresholder height =

$$\frac{(\text{Max. Doc. Ht.}) \times (\text{Resolution})}{\text{Number of channels}} + KD_y + D_1.$$

The channel thresholder height is expressed in pixels. The equations EQ. 1 through EQ. 4 are associated with a reduction factor of one; these equations change slightly for different reduction factors. The changes for a second embodiment will be discussed later herein. The term "TRUNC" in the equations just relates to truncating certain numbers into whole numbers; this, also will be discussed later herein. When all the rows of pixels in a window, like 66 in FIG. 7, are used in calculating the average gray level as discussed in relation to FIG. 6, then a reduction factor of one is employed. If every third row of pixels is used in calculating the average gray scale level, then a reduction factor of three is employed. It should also be noted that the pixel Queues #1 and #2 shown in FIG. 8A are not circular memories; they simply represent addressing schemes used by the system 10 to effect loop-type memories. The terms $D_1$, $D_2$, and $D_3$ (read as "Delta") are used to influence the equations EQ. 2, EQ. 3, and EQ. 4 by design implementation dependencies such as:

1. The delay pipelines 78, 92, and 98 shown in FIG. 13, which are constant for all applications; and 2. The number of overhead pixels required for each scan line of a particular application. The overhead pixels will be discussed later herein. Notice from FIG. 7 that as the window 66 is moved downwardly, as viewed in FIG. 7, and after enough scans have accumulated to fill the window 66, a new pixel $NP_i$ is added to the NP-CP queue #1 and a center pixel $CP_i$ under consideration is removed therefrom. As previously stated, the center pixel $CP_i$ is copied into the CP-OP queue #2 and the old pixel $OP_i$ is removed therefrom.

Having described the processing associated with the examining window 66 (FIG. 7) in a general way, it now seems appropriate to discuss this processing in a detailed manner. Assume that the window 66 is full of pixels and that the processing begins at a time (t=i). At time (t=i), the data outputs from the various queues shown in FIGS. 8A, 8B, and 8C are as follows:

Pixel Queue #1=$CP_i$;
Pixel Queue #2=$OP_i$;
Input Row Sum Queue #1=$IRSUM_i$; and
Top Row Sum Queue #2=$TRSUM_i$.

At the same time (t=i), the data inputs to the same queues mentioned are:
a420,300
Pixel Queue #1=$NP_i$;
Pixel Queue #2=$CP_i$;
Output Row Sum Queue #1=$ORSUM_i$; and
Bottom Row Sum Queue #2=$BRSUM_i$.

There are several equations which are also used in processing the data with the window 66; these equations are for processing data at a time (t=i+1) as follows:

$$BRSUM_{i+2}=NP_i+IRSUM_i; \quad (EQ. 5)$$

$$ASUM_{i+1}=ASUM_i+BRSUM_{i+1}-TRSUM_i; \text{ and} \quad (EQ. 6)$$

$$ORSUM_{i+1}=TRSUM_{i-2}-OP_i \quad (EQ. 7)$$

The equations EQ. 5, 6, and 7 are better understood in relation to FIG. 7. A technique is employed to facilitate the calculations of the pixels included in the examining window 66, with each pixel being six bits of data at this time. As the window 66 is moved downwardly (as viewed in FIG. 7) a row at a time, a new pixel (NP) is picked up and an old pixel (OP) is dropped off as previously explained. The bottom row sum $BRSUM_i$ at time (t=i) is included within the examining window 66. At time (t=i), the input row sum $IRSUM_i$ does not contain the new pixel (NP); however, after one clock period, the new pixel is added to the input row sum as indicated by equation (EQ. 5) to become a bottom row sum $BRSUM_{i+1}$ as shown in FIG. 7. This $BRSUM_{i+1}$ is then ready to be added to the total within the window 66, and after another clock, it becomes the bottommost row sum within the window 66.

There are transactions occurring at the top of the examining window which correspond to those just described in relation to the bottom of the window 66. At a time (t=i) the topmost row sum in the window 66 (FIG. 7) is $TRSUM_i$. The top row sum just prior to time (t=i) is $TRSUM_{i-1}$ as shown; in other words, it's outside the window 66, and it contains the old pixel (OP). At one clock later, the old pixel (OP) is subtracted from the top row sum (which is actually $TRSUM_{i-2}$) as indicated by equation (EQ. 7) to become the output row sum $ORSUM_{i+1}$. At time (t=i), the output row sum is $ORSUM_i$. From equation (EQ. 6), the sum of the pixels in the area bounded by the window 66 at time (t=i+1) is equal to the area sum $ASUM_i$ plus the pixels in the bottom row sum $BRSUM_{i+1}$ minus the top row sum $TRSUM_i$.

Figure 13:
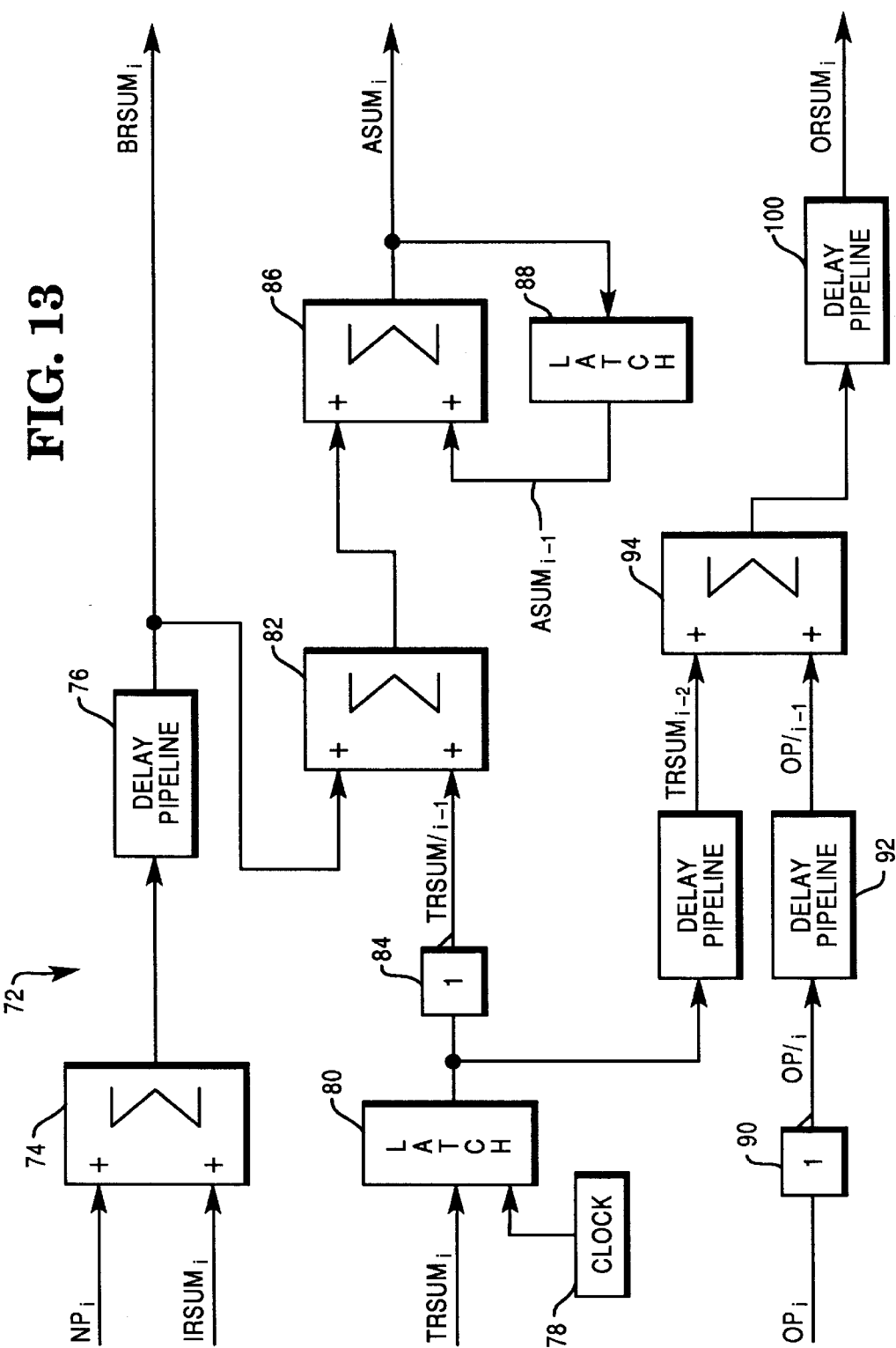
FIG. 13 is a schematic diagram showing how thresholding is effected for one of the thresholders shown in FIG. 1.

FIG. 13 is a schematic diagram which shows how the manipulation of data takes place in a circuit 72 included in a thresholder, like thresholder #1 associated with channel #1 shown in FIG. 1. The values used in the circuit 72 are for time (t=i). Accordingly, the equations (EQ. 8, 9, and 10) used for for time (t=1) are similar to equations (EQ. 5, 6, and 7). The equations are:

$$BRSUM_i=NP_{i-2}+IRSUM_{i-2}, \quad (EQ. 8)$$

$$ASUM_i=ASUM_{i-1}+(BRSUM_i-TRSUM_{i-1}), \text{ and} \quad (EQ. 9)$$

$$ORSUM_i=TRSUM_{i-2}-OP_i.$$

At time (t=i), the data going to and coming from all the queues shown in FIGS. 8A, 8B, and 8C all have the subscript "i" as shown.

With regard to FIG. 13, a new pixel $NP_i$ is added to the input row sum $IRSUM_i$ at adder or summer 74, and the output therefrom is delayed by a delay pipeline 76 to produce the bottom row sum $BRSUM_i$. The circuit 72 is clocked by a clock 78 which is coupled to the elements shown in FIG. 13 to step the data around the circuit; however, the clock 78 is connected only to a latch 80 to simplify this figure. From equation (EQ. 8), the bottom row sum $BRSUM_i$ is derived from a new pixel NP and an input row sum which occurred two clocks earlier relative to $BRSUM_i$. The output from the delay pipeline 78 is fed into a summer 82.

Summer 82 (FIG. 13) performs the function of providing a difference in sum between the bottom row sum $BRSUM_i$ and the top row sum $TRSUM_{i-1}$ as indicated by that portion of the equation (EQ. 9) which is included in parentheses. The top row sum $TRSUM_i$ is fed from the latch 80 and is inverted by an inverter 84 to generate $TRSUM/_{i-1}$, with the (/) symbol being used to indicate an inverted or "bar" condition; this value from the inverter 84 is "subtracted" from the $BRSUM_i$ sum by the summer 82. The output from the summer 82 is fed into another summer 86 where the final summing associated with equation (EQ. 9) is effected. The area sum $ASUM_{i-1}$ from a prior clock period, is stored in a latch 88 and is fed into the summer 86 upon the arrival of the output from the summer 82 thereto to generate the area sum $ASUM_i$ output as indicated by equation (EQ. 9).

The output row sum $ORSUM_i$ shown in FIG. 13 is derived from equation (EQ. 10) and is effected by the circuit 72 for the purpose of subtracting the old pixel OP from the output row sum. In this regard, the pixel $OP_i$ is inverted by an inverter 90 and is thereafter passed through a delay pipeline 92 to delay it by one clock to generate a signal $OP/_{i-1}$ which is fed into a summer 94. The top row sum $TRSUM_i$ coming from the output of the latch 80 is passed through a delay pipeline for two clocks to generate a signal $TRSUM_{i-2}$ which, in turn, is fed into the summer 94. The top row sum or signal $TRSUM_{i-2}$ really is equal to the output row $ORSUM_{i+1}$ plus the old pixel $OP_i$ shown in FIG. 7, and when this signal is delayed by one clock by a delay pipeline 100, the output row sum $ORSUM_i$ is obtained.

The inputs and outputs shown in FIG. 13 are utilized in the circuits shown in FIGS. 8B and 8C. There is a circuit 102 (shown in FIG. 8B) for each of the thresholders #1–190 N shown in FIG. 1, and correspondingly, there is a circuit 104 for each of the named thresholders. The circuit 102 includes the queue controllers 106 and 108, a multiplexer 110, and the Row Sum Queue #1 already alluded to. The queue controllers 106 and 108 are identical in construction; accordingly, a discussion of only queue controller 106 will be given.

Figure 14:
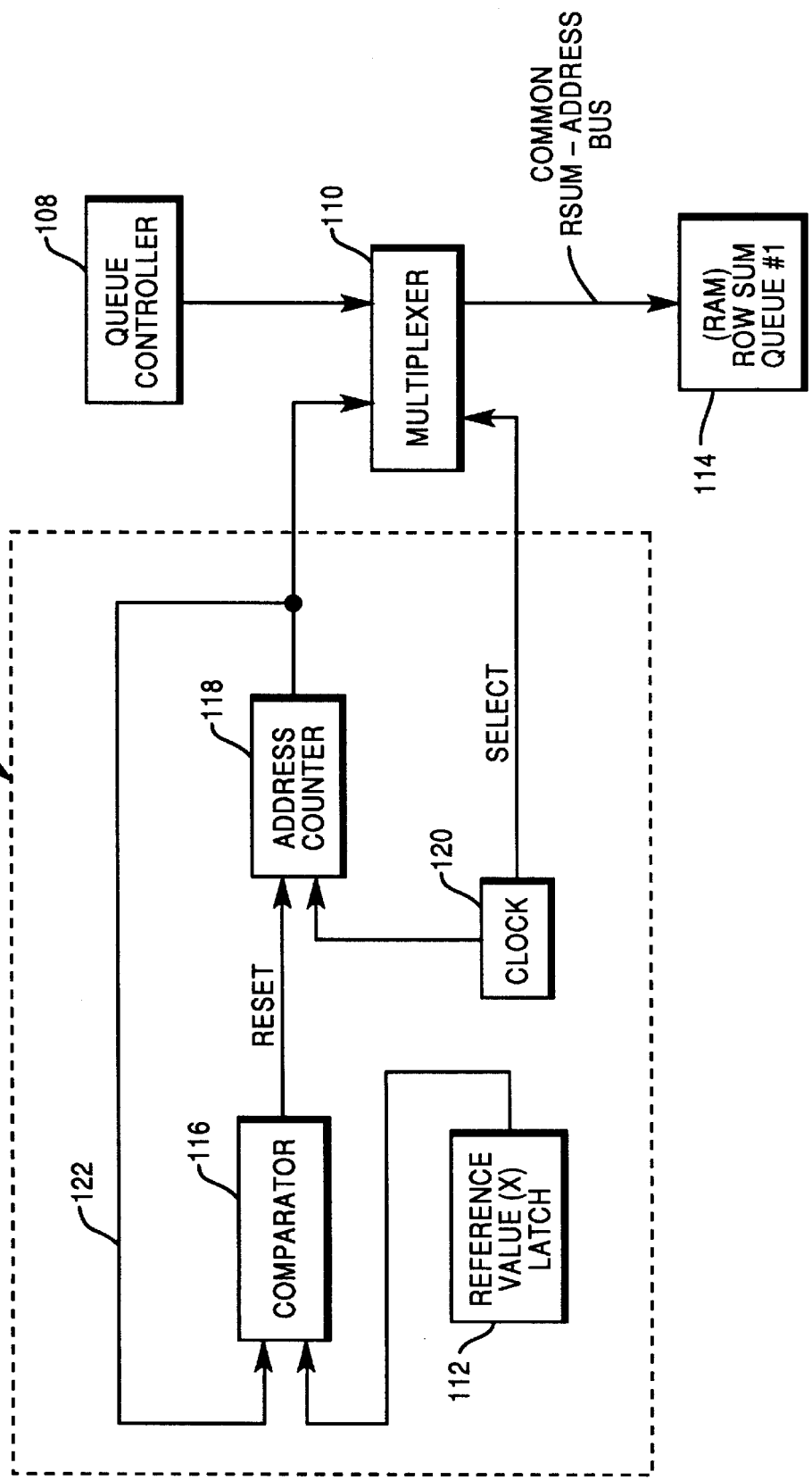
FIG. 14 is a schematic diagram showing details of a queue controller shown in FIGS. 8A, 8B, and 8C.

The function of the controller 106 (FIG. 14) is to provide the addresses for the locations where data is to be stored in the Row Sum Queue #1. The controller 106 includes a latch 112 in which a reference value (x) is stored. The reference value (x) represents the last usable address which is to be used in a RAM 114 of which the Row Sum Queue #1 is comprised, with a zero address being the starting address and with the length of this queue extending between the zero address and the last usable address or reference value (x). The reference value (x) is fed into a comparator 116, and the other input to the comparator 116 comes from the output of an address counter 118. Whenever the address counter 118 is reset, it outputs a zero to the comparator as the first input thereto. A strobe or clock 120 is used to increment the address counter 118 from its zero position towards the reference value (x) to provide the addresses to the Row Sum Queue #1 (RAM 114) via the multiplexer 110. As the address counter is incremented, the output thereof is fed to the comparator 116 via a line 122. When the output of the address counter 118 reaches the reference value (x), the comparator issues a reset signal to reset the address counter 118 to repeat the process of providing addresses to the Row Sum Queue #1 as described.

The queue controller 108 (FIGS. 8B and 14) functions in the same manner as the queue controller 106 just described. For functions, the queue controller 108 is used to control the address for the output row sum $ORSUM_i$ being read out of the Row Sum Queue #1, while the queue controller 106 controls the address of the input row sum $IRSUM_i$ being read into the Row Sum Queue Sum #1. The select signal for the multiplexer 110 is derived from the clock 120. The multiplexer 110 is needed because two different addresses are accessed during each summing operation associated with the window 66 shown in FIG. 7. In other words, the queue controller 106 points to an address for the input row sum $IRSUM_i$ which is to be added to the window 66, and the queue controller 108 points to an address for the output row sum $ORSUM_i$ which is to be deleted from the examining window 66.

The circuit 104, shown in FIG. 8C, includes a queue controller 124 which functions as an address pointer relative to the Row Sum Queue #2. The queue controller 124 functions conventionally as a single address pointer to provide an address where the old data ($TRSUM_i$) is read out of the Row Sum Queue #2 and the new data ($BRSUM_i$) is read therein. The queue controllers 134 and 136 function in the same manner as queue controller 124 in that they are used conventionally as pointers to point to a single address in their associated Queues #1 and #2 shown in FIG. 8A. For example, queue controller 134 points to a single address in the NP-CP Queue #1 from which the center pixel $CP_i$ is removed, and the new pixel $NP_i$ is inserted. At the next clock, the queue controller 134 points to a new address to repeat the process described.

For each one of the thresholders #1–#N, there is a "wrap around" portion for the associated channel. For example, if the rows of data shown in FIG. 7 are associated with channel #1, the top boundary 68 provides an overlap portion for the top border of a document or item 12, and the bottom boundary 70 comes from some overlap into the channel #2 as previously described. When the window 66 is moved downwardly from the position shown in FIG. 7 to a position in which the center pixel under examination is located at the lowermost row of the associated channel (row 224 in FIG. 3), the bottom 12 rows included in the window 66 are derived from the 12 topmost rows (rows 225–236) of channel #2, and the 13 top rows of window 66 are obtained from rows 212–224. This means that the pixels in row 224 were thresholded in relation to pixels within channel #1 and the overlapping rows 225–236 in channel #2. When the window 66 moves down one more row to locate the center pixel of the window at row 225 in FIG. 3, the window 66 begins to pick up the top row of the top boundary 68 in FIG. 7. This is because the overlapping for channel #1 is obtained by the top boundary 68 and the overlapping rows mentioned from channel #2. As far as each channel is concerned, the pixels within the overlapping areas themselves are not not thresholded but are merely used to provide the surrounding pixels to evaluate those pixels within a channel which come close to the extremities of each of the channels.

In a similar manner, the overlapping for channel #2 is obtained by the bottom 13 rows of channel #1 and the top 12 rows of channel #3. This process is repeated for the remaining channels #2–#4 shown in FIG. 3. It should be recalled that each of the channels #1–#4 has its own window 66. When the associated window 66 is lowered so that the center pixel is located at row 899 in the example being described, the window 66 (channel #4) would have included therein the bottom 12 rows of the bottom boundary 70 (FIG. 7). When the window 66 is "moved down" one more row in the example being discussed, the associated window 66 begins to include therein, the top row #675 of channel #4 due to the "wrap around" with each of the channels mentioned. At this point, the associated window 66 (channel #4) is moved over one column to the left (FIG. 7) so that a new scan line of data is presented to the window 66 to repeat the process of calculations being described. The procedure described in relation to FIG. 7 is then repeated for the new scan. While the processing is being performed for channels #1 and #4 as described, identical processing is being performed for the remaining channels #2 and #3, with all the channels #1–#4 operating from the same essential clock. In actuality, thresholder #1 and compressor #1 shown in FIG. 1 are located on a single board, and correspondingly, thresholders #2 and compressor #2 are also located on a separate board. The same is true for the remaining thresholders #3 and #N, and their associated compressors #3 and #N shown in FIG. 1. It is perhaps more correct to say that each combination, like thresholder #1 and compressor #1, has its own clock, but all the clocks for each of the combinations of thresholder and associated compressor mentioned operate at the same frequency. Providing each of these combinations with its own individual clock minimizes noise and static E.M.I. (Electro Magnetic Interference).

The circuit 130, shown in FIG. 8A and alluded to earlier herein, is utilized to obtain the new pixel $NP_i$, the center pixel $CP_i$, and the old pixel $OP_i$ which are utilized in the processing performed in association with the window 66 shown in FIG. 7. The circuit 130 includes a latch 132 to receive the pixel stream coming from the scanning line 14, with the pixels for individual channels coming from the splitter 32 (FIG. 1). The circuit 130 also includes queue controllers 134 and 136 which are used to control the assignment of addresses in the NP-CP Pixel Queue #1 and the CP-OP Pixel Queue #2, respectively. The queue controllers 134 and 136 are identical to the controller 106 (FIG. 14) and perform generally as previously discussed.

To review, FIG. 7 shows how the window 66 is moved along the various scan lines and rows and how the various sums like $IRSUM_i$ and $ORSUM_i$ are used in relation to the window 66. It should be recalled that there is a window like 66 for each of the channels #1–#4 being discussed. FIGS. 8A, 8B, and 8C show how the various data used in the processing associated with window 66 is stored. And FIG. 13 shows how some of the data associated with the processing associated with window 66 is derived. As alluded to earlier herein, the actual thresholding of a center pixel CP in relation to its surrounding pixels included in the window 42 was described, generally, in relation to FIG. 6.

Figure 15:
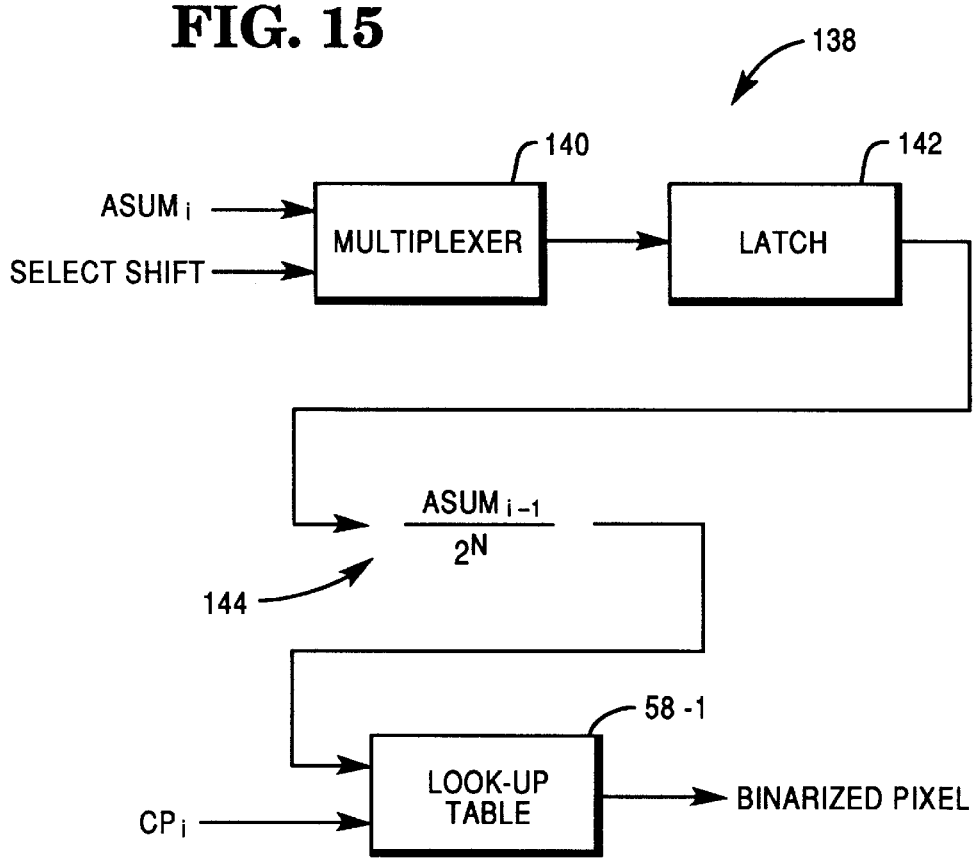
FIG. 15 is a schematic diagram showing a process used for calculating an average gray scale value included in the examining window shown in FIG. 7.

It should be recalled that the average gray level 56 included in the window 42 (FIG. 6) was derived by summing all the gray scale values for the pixels included in the window 42 and dividing that sum by the number of pixels included in the window 42. FIG. 15 shows a circuit 138 which is used to calculate the average gray scale value, with the calculations being performed in relation to the window 66 shown in FIG. 7.

Before discussing the circuit 138 (FIG. 15), it seems appropriate to discuss the mathematics involved as they relate to the window 66 shown in FIG. 7. The window 66 contains 25 pixels along the row direction and contains 25 pixels along the column direction, making a total of 625 pixels included in the window 66. The average gray scale value within the window 66 is given by equation EQ. 11.

$$\frac{\text{Total Gray Scale Value of Window 66}}{\text{Total Number of Pixels Within the Window 66}} = \frac{\text{Total Gray Scale Value of Window 66}}{2^x} = \frac{\text{Total Gray Scale Value of Window 66}}{2^n \cdot 2^f} \quad \text{(EQ. 11)}$$

In the embodiment described, the number of pixels within the window 66 is 625. In equation EQ. 11, the n in the denominator is really the 9th power of 2 which is equal to 512, and 2 to the f power is the fractional part (which relates to 625 divided by 512=the fractional value of 1.22 ) which is also incorporated into the look-up table 58 (FIG. 6). The log of 1.22 to the base 2 is greater than 0 but less than 1.

If the window 66 were of a size which equalled a binary multiple, there would be no "remainder" or fractional value of 1.22 to contend with. However, in the embodiment described, this remainder portion is included in the look-up table 58 as previously discussed in relation to FIGS. 6 and 10, for example. The remainder portion just discussed is included in a "scaled and adjusted look-up table" 58-1 shown in FIG. 15A. The center pixel under consideration $CP_i$ and the total gray scale value divided by $2^N$ are used as addresses to the look-up table 58-1, with the output therefrom being the binarized pixel.

Figure 15A:
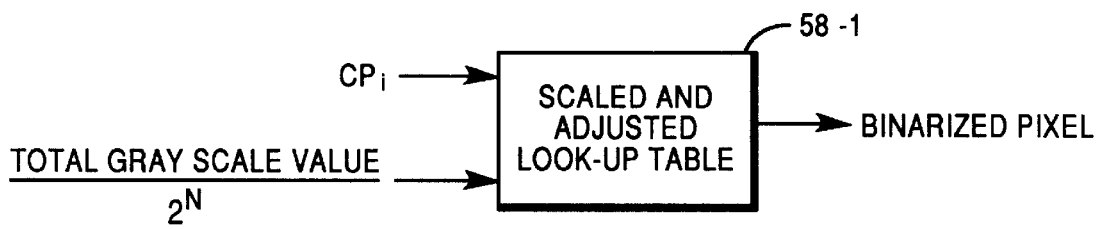
FIG. 15A is a schematic diagram showing a look-up table used in thresholding a center pixel in the examining window.

The look-up table 58-1 shown in FIG. 15A is equivalent to the adjusted look-up table embodied in the graph shown in FIG. 10, but it is rescaled along the X axis by the factor of $2^F$ discussed in the previous paragraph. This rescaling automatically completes the division process embodied in Equation EQ. 11 when the two inputs shown in FIG. 15A are applied as addresses to the look-up table 58-1.

In order to perform the division relative to equation EQ. 11, the circuit 138 shown in FIG. 15 is used. The circuit 138 includes a multiplexer 140 which receives the area sum $ASUM_i$ (for window 66) from the summer 86 shown in FIG. 13. For the embodiment described, the sum of all the gray scale values included in the window 66 is a value about 20 bits wide. Dividing this sum (20 bits wide) by "n" (as discussed in relation to equation EQ. 11) when using the multiplexer 140, amounts to "removing 9 of the least significant bits of data". Removing 9 bits in this manner results in a value which is 11 bits long, and the value represents the average gray scale value included in the window 66; this value is stored in a latch 142, and it is shown by reference numeral 144 in FIG. 15. It should be recalled that the $2^F$ portion mentioned in the denominator of equation EQ. 11 is included in the look-up table 58. The average gray scale value for the window 66 (shown by reference numeral 144 in FIG. 15 and by box 56 in FIG. 6) and the center pixel $CP_i$ (coming from NP-CP Queue #1 in FIG. 8A) are then applied as addresses to the look-up table 58-1 to threshold the center pixel into a binary 1 or 0 as previously discussed. Again, there is one such circuit 138 provided for each of the channels associated with the system 10.

After having described how the thresholding is effected in the system 10, it appears appropriate to discuss how compression is used in this system. As previously stated, there is one compressor, like compressor #1, associated with each thresholder shown in FIG. 1. For example, thresholder #1 is used to process the pixels ranging from pixel #0 through pixel #224 as discussed in relation to FIG. 3. The output from thresholder #1, for example, is a binarized version which is outputted from the associated look-up table 58 as discussed in relation to FIG. 15 to compressor #1.

One of the features of the present invention is that the data at the scanning line 14 is scanned in a vertical direction (as viewed in FIG. 1) so as to produce a plurality of successive columns of data, and the compression is done on a plurality of rows of data for each of the channels #1–#N shown in FIG. 1. For example, a typical prior art application for the CCITT coding is to scan data along rows of an 8½×11 inch document and to do the compression along rows of the document. As stated earlier herein, the compression technique which is used is the CCITT Group 4 method or scheme which is a relative address coding method in that it utilizes an interrelation between a pixel on a current coding or target line and a pixel on the preceding scan or reference line. This particular technique requires a reference line for use in compressing the data on the target line. As discussed in relation to FIG. 7, the top boundary 68 has one more row therein than does the bottom boundary 70. One of the reasons for this is that by this technique, there will always be a reference row or line to be used when compressing the data for a particular channel. For example, when compressing the top row #225 of channel 30-2 shown in FIG. 3, the bottom row #224 of channel 30-1 will be used as the reference line. Correspondingly, when the top row 0 of channel 30-1 is to be compressed, the bottom row of the top boundary 68 (FIG. 7) will be used as the reference line. When row #1 of channel #1 is to be compressed, row #0 of channel #1 is used as the reference line. By this technique, each compressor #1–#N, shown in FIG. 1, can operate independently and in parallel on the particular data assigned to it.

Figure 16:
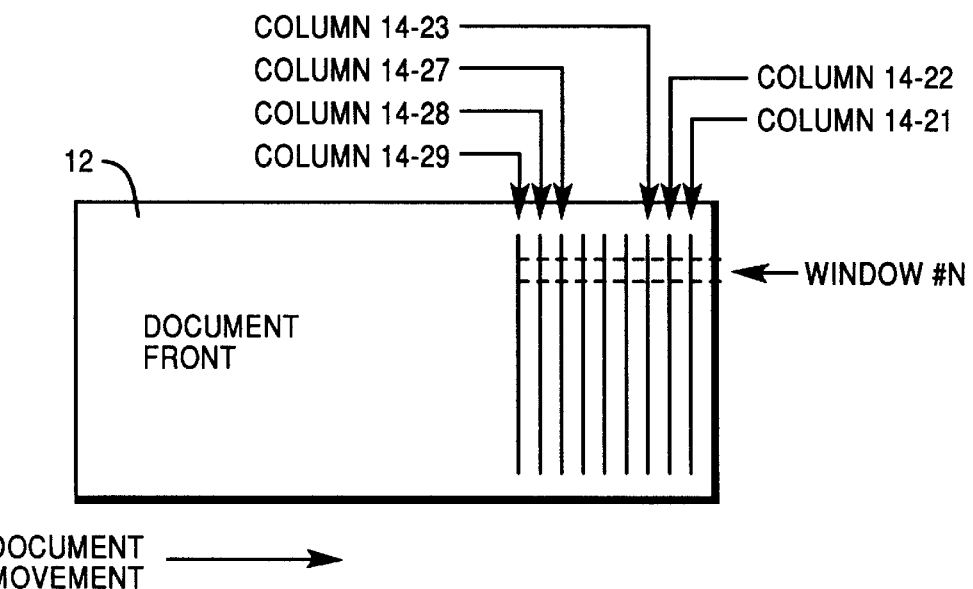
FIG. 16 is a schematic view of the front of item 12 shown in FIG. 1, showing various scanning columns thereon.
Figure 17:
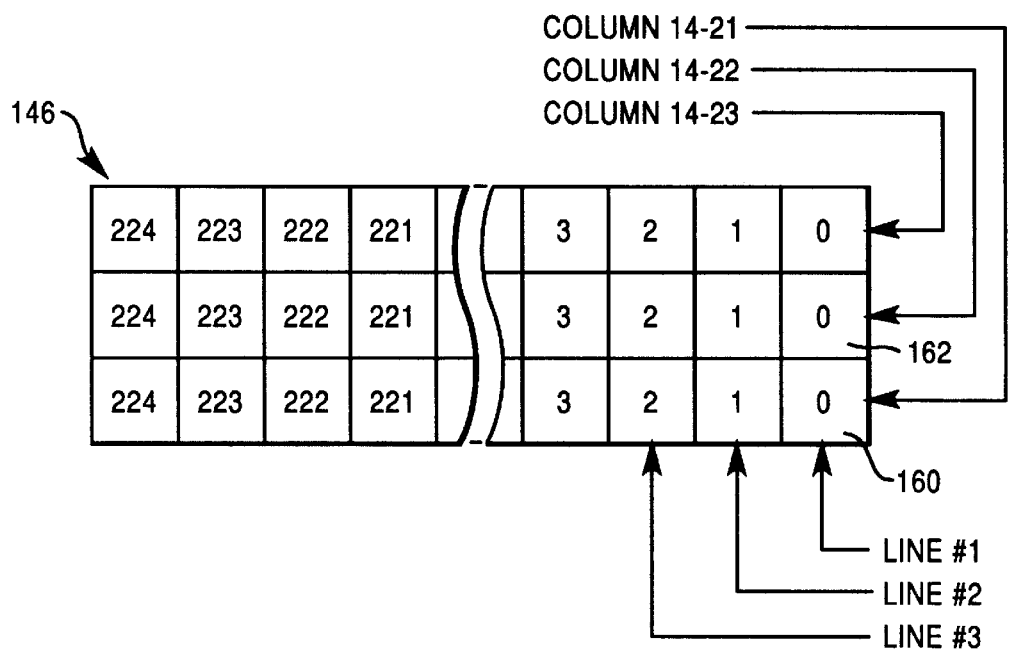
FIG. 17 is a schematic view of a memory, showing how the thresholded binary data coming from an associated thresholder in FIG. 1 is placed in memory to begin the compression associated with the compressors shown in FIG. 1.

As stated previously, the scanning is done in a vertical direction or along columns and the compression is done along a horizontal or row direction in the embodiment described. In this regard, FIG. 16 shows a document 12 being scanned along successive columns 14-21, 14-22, and 14-23, for example. FIG. 17 shows how several consecutive columns of data from FIG. 16 are placed in a memory 146, with one such memory being provided for each of the compressors #1–#N in the system 10. The numbers 0–224 for each column, like 14–21, relate to the particular pixel locations for each of the scan lines in the first channel 30-1 shown in FIG. 1. The data within each of the locations shown in FIG. 17 would be already thresholded to a binary one or a binary zero at this time. The data is compressed along rows of data which are shown as Line #1, Line #2, and the like, although the data is received in sequence along columns. This is a feature of the present invention. Assume that the scanning is done from the top to the bottom as viewed in FIG. 16, and the scanning proceeds from right to left as viewed in this figure. When using the CCITT coding mentioned, seven bits of data are examined in a window designated as window #N in FIG. 16. When the window #N is at the very top of the data (FIG. 16), the first 7 columns of data (columns 14-21 through 14-27) are examined and compressed; this corresponds to Line #1 shown in FIG. 17. The window #N is then moved down one row position as viewed in FIG. 16 to examine and compress the data in columns 14-21 through 14-27; this corresponds to Line #2 shown in FIG. 17. This process is repeated until the window #N reaches the row 224 (FIG. 3) which represents the end of channel #1 in the example being described. Thereafter, the window #N is moved over one column to the left (as viewed in FIG. 16) to start at the top of the document; this action drops off the data associated with column #14-21 and picks up the data associated with column #14-28 for Line #1 (FIG. 17. This process is repeated until all the data on the document 12 is compacted.

It would be useful to describe how the coding is effected, generally, when using the CCITT coding mentioned. The coding method generally provides for coding a "change of color" bit under consideration in a target line (like Line #1, Line #2 etc. in FIG. 17) with change of color bits in a reference line. The change of color bits will be referred to hereinafter as "COC" bits. FIG. 17 can be viewed as the format for the memory organization when receiving the thresholded pixels from the thresholders #1–#N (FIG. 1) and also as the format for the COC bits which are derived from the thresholded pixels. In this regard, a thresholded pixel is compared with its immediately prior thresholded pixel to determine whether or not there is a change in color. If there is a change in color, a COC bit of binary 1 is assigned to the thresholded pixel under consideration. If there is no change in color (ie. both black or both white), a binary 0 is assigned to the thresholded pixel under consideration. Essentially, an Exclusive OR gate is used to obtain the COC bits; this aspect will be described hereinafter.

Figure 18:
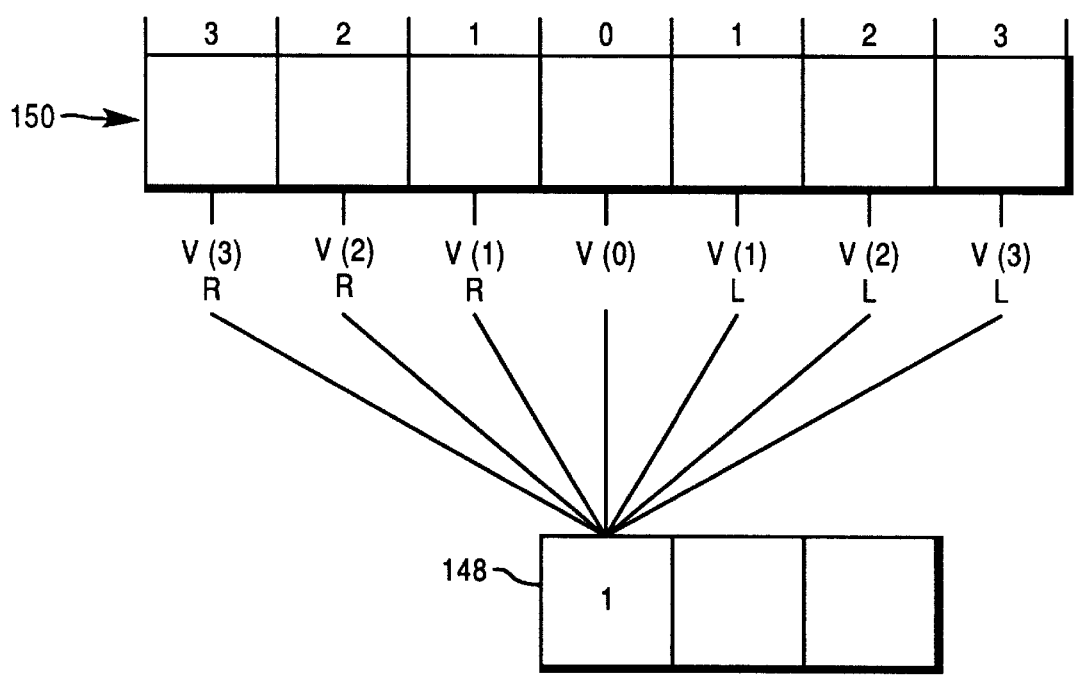
FIG. 18 is a schematic diagram showing how compaction coding is effected.

FIG. 18 is a schematic drawing showing how a COC bit under consideration is referenced to some prior COC bits by a code. For example, COC bit 48 is the bit under consideration in the target row, and row 150 is the reference row. As previously stated, a binary 1 as used in the coding indicates that there is a change in the color of the pixels in the row; that is, it changes from white to black or from black to white. A binary 0 indicates that there is no change in color in the reference row. A binary 1 for the pixel under consideration indicates also that there is a change in the color of pixels in the target row at that location. Similarly, a binary 0 for the pixel under consideration indicates that there in no change from the prior pixel in the target row. As a review at this point, the thresholded data coming from thresholders #1–#N is in the form of a binary 1 or 0, with a binary 1 indicating the presence of data. The thresholded data is processed by a circuit shown in FIG. 20 (to be later described herein) to arrive at the COC bits in the reference and target rows as described previously in this paragraph.

In FIG. 18, the comparing is done from left to right, and the various codes shown thereon relate to the COC bit 148 under consideration. For example, when the change in color appears at position 3 (to the left of position 0) in the reference line 150 and there is a change in color at the COC bit 148 under consideration, the positional coding for this situation is represented by $V_R(3)$; this coding relationship is shown in Column #1 at Row #1 of Chart #1 of FIG. 19. The "R" in the positional coding means that the pixel 148 under consideration is to the "right" of the change in pixel color which occurred in the reference row 150. The "V" in the positional coding refers to "vertical" or the prior row. When the change of color in the reference row 150 occurs at position 0, the positional coding for this relationship is represented by $V(0)$ as shown in Column #1 at Row #4 of Chart #1. If the change in pixel color occurs at position 2 (to the right of position 0) in FIG. 18, the positional relationship is represented by $V_L(2)$; this situation is shown in Row #6 of Chart #1. This situation also means that the COC bit 148 under consideration is located to the "left" of the reference position in the reference row 150. If all the bits in the reference row 150 were binary "1"s, it would mean that the reference row is like a checkerboard, in that white and dark pixels would alternate along the length of the reference row. If there are all "0"s in the reference row, it means that all the pixels in that portion of the row are all either white or they are all black.

Basically what is shown in FIG. 18 is a quick and efficient way of encoding the thresholded pixels coming from the thresholders #1–#N. If the COC bits do not fit into one of the patterns or codings shown in FIG. 18, the system resorts to horizontal encoding which is like "run length" encoding.

Continuing with Chart #1, Column #2 therein contains the reference designations discussed relative to FIG. 18. Column #3 in Chart #1 represents a new way of coding the designations occurring in Column #2. For example, the positional coding $V_R(3)$ is represented by (7), and the positional coding $V_L(3)$ is represented by (1); this way of coding reduces the memory requirements of the system 10. Row #8 in FIG. 19 represents a type of "run length encoding" and Row #9 represents a "pass" situation; these two situations will be discussed hereinafter.

Figure 20A:
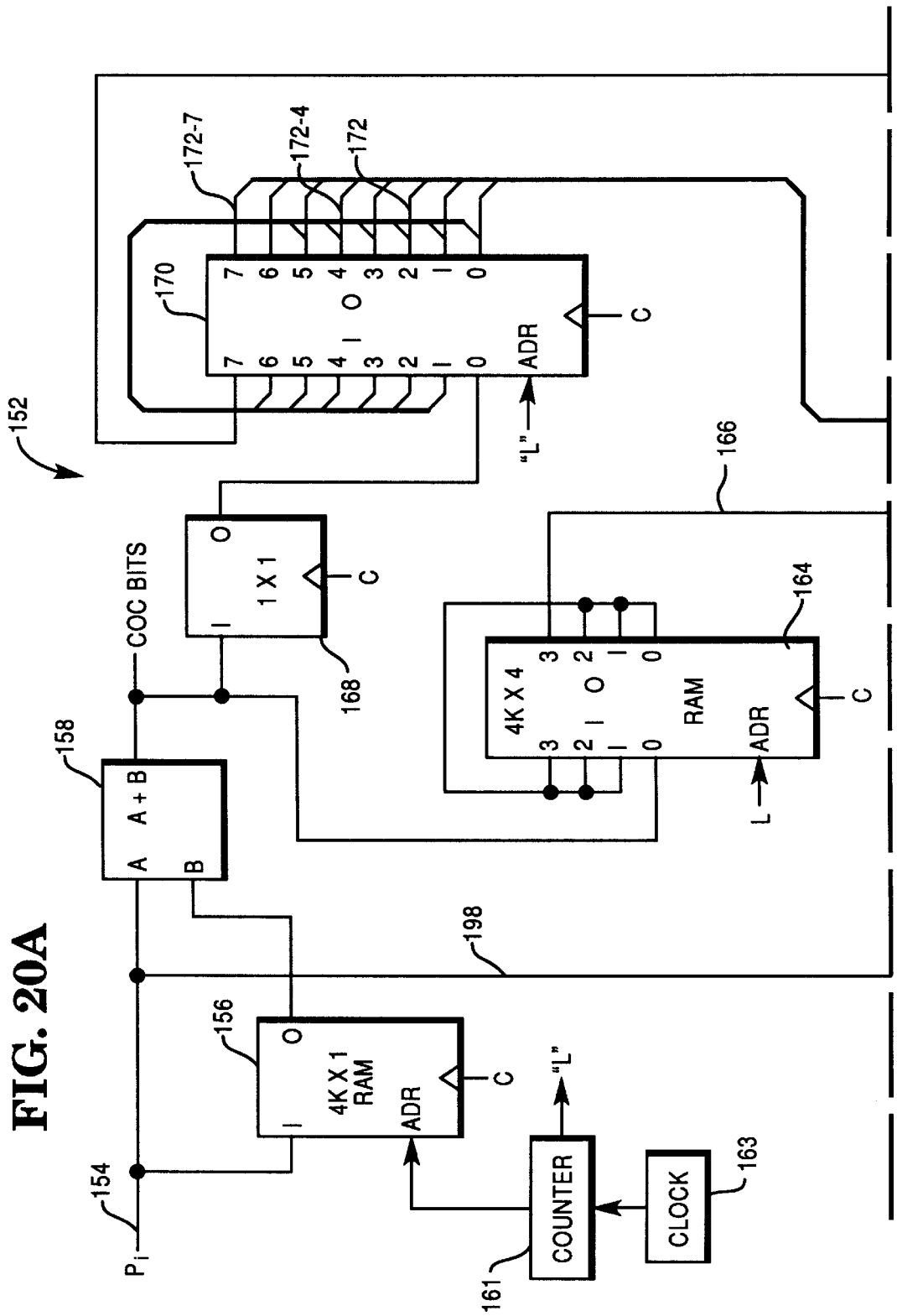
FIGS. 20A and 20B, taken together, show a circuit to effect the coding mentioned with regard to FIG. 19.
Figure 20B:
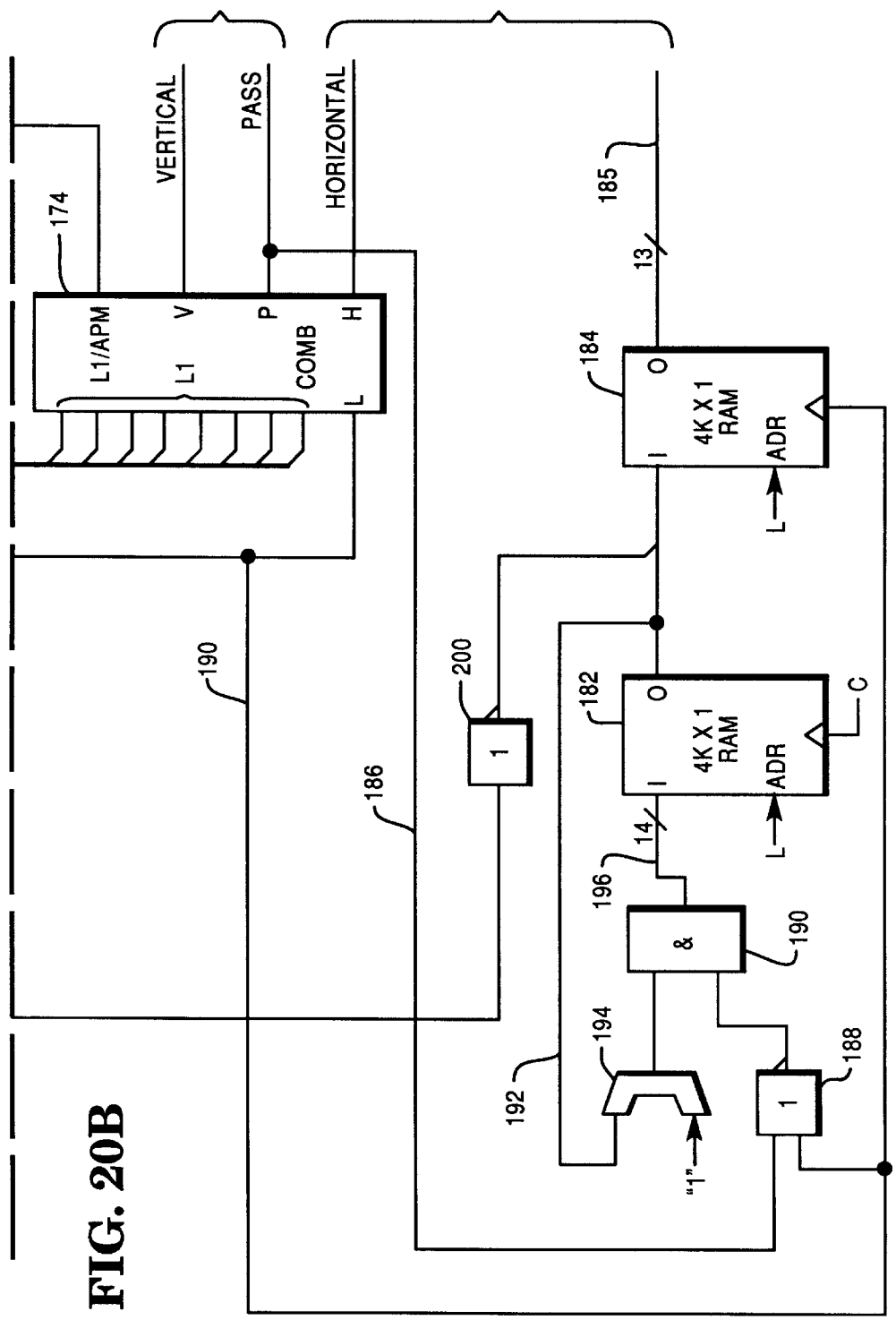

FIGS. 20A and 20B show a circuit diagram 152 which may be used to effect the coding mentioned. There is one such circuit for each of the channels shown in FIG. 1 as previously discussed. Assume that circuit 152 processes the data coming from thresholder #1; this means that the pixels which are thresholded will be those coming from pixels 0 through 224 as shown in FIG. 3. The binarized pixels for channel #1 come from the associated look up table 58 as discussed in relation to FIG. 15.

Continuing with a discussion of FIG. 20A, the binarized pixels, like $P_i$, from the associated look up table 58 are fed as a serial stream over conductor 154 to a RAM 156 in such a manner as to present one continuous string of pixels as shown by Line #1 in FIG. 17. The RAM 156 stores just one column of pixels for the associated channel, and as pixels from the second column of pixels arrive at the RAM 156, the first column of pixels will be outputted therefrom. In other words, as pixel 0 from column 14-22 (Line #2 in FIG. 17) arrives at the RAM 156, pixel 0 from column 14-21 (Line #1 in FIG. 17) leaves the output 0 of RAM 156 and is fed into the B input of an Exclusive OR gate 158. The incoming pixel $P_i$ on conductor 154 is also fed into the A input of Exclusive OR gate 158. Whenever there is a difference at the inputs of the Exclusive OR gate 158, the output thereof will have a binary "1" thereon. What this means is that there is a change in pixel color between the first pixel in column 14-21 and the first pixel in column 14-22. With reference to FIG. 17, whenever there is a change in color between the pixel in location 160 in Line #1 and the pixel in location 162 in Line #1, the output of Exclusive OR gate 158 will be a binary "1"; if there is no difference, the output will be a binary "0". The changes in color are referred to as "change of color bits" ("COC") as previously explained. Notice from what has been just said that while the scanning is done on a column by column basis, as shown in FIG. 16, the actual comparison of COC bits is done on a row by row basis as shown in FIG. 17. When looking at FIG. 17, the columns (from FIG. 16) appear as horizontal entries, while the rows (Lines #1, #2, etc.) appear as vertical entries. Comparing the COC bits on a row by row basis is one of the features of this invention.

Continuing with a discussion of FIGS. 20A and 20B, the addresses for the RAM 156 are provided by a counter 161 which counts from 0 through 124 to provide the correct addresses for the RAM 156 prior to being reset to repeat the process of providing addresses for the next column of pixels to be processed. The addresses to the RAM 156 are provided over address lines which are shown simply as line "L". The address "L" represents a row number as viewed in FIG. 16 or a Line number (FIG. 17) to which the pixel being processed belongs. A clock 163 is used to increment the counter 161, with the channels #1 through #N (FIG. 1) operating at the same clock frequency with one clock per pixel input.

The next step in processing (FIG. 20A) is to take the output from the Exclusive OR gate 158 and propagate this output through a four bit wide RAM 164. The COC bits from Exclusive OR 158 for Line #1 (FIG. 17), for example, are fed into the 0 input of the RAM 164 at addresses "L", supplied by the counter 160. The "0" output of the RAM 164 is coupled to the "1" input of this RAM as is conventionally done; the "1" output of the RAM 164 is coupled to the "2" input of this RAM; "2 out is connected to 3 in"; and the "3" output of the RAM appears on conductor 166. In effect, the output coming from the RAM 164 is delayed by four columns (as viewed in FIG. 16) relative to the output from the Exclusive OR gate 158, and, as column 14-22 of COC bits is entering the "0" input of this RAM, column 14-21 of COC bits is available at the output of this RAM. The change of color bits coming from the output of the Exclusive OR gate 158 are delayed by one Line in passing through the flip flop 168 prior to being fed into the "0" input of a RAM 170, thus effecting a delay of one row (as viewed in FIG. 16). The "0" output from the RAM 170 is fed into the "1" input thereof so as to provide a delay as discussed in relation to RAM 164. The output of the RAM 170 appears on conductors designated generally as 172 which are fed into a comparator 174. To summarize what is happening, as a column of COC bits associated with column 14-28 (FIG. 16) is entering the "zero" input of the RAM 170, the COC bits associated with columns 14-21 through 14 -27 are available at the outputs "0" through "7", respectively, of the RAM 170. The eight COC bits coming out of the RAM 170 are similar to eight bits which would appear in Line #1, for example. Other examples of 8 COC bits appear in Rows #1–#7, for example, under Column #1 shown in FIG. 19. The COC bit 176 (FIG. 19) comes out of the RAM 170 on conductor 172-4 which represents a fourth earlier COC bit in the row, whereas the COC bit 178 represents a seventh earlier bit and bit 178 would come out of the RAM 170 on conductor 172-7. The COC bit 180 (FIG. 19) is the COC bit under consideration, and it is fed out of the RAM 164 on conductor 166 to the comparator 174. This is the point at which the CCITT coding mentioned takes place. The situation shown in Column #1 and Row #1 in FIG. 19 would be coded as shown under Column #2 as $V_R$ (3) as previously discussed. In other words, the COC bit 180 under consideration is three positions to the right of the bit 178 shown in FIG. 19. For those situations which do not fit into the positional coding shown under column #2 in FIG. 19, "run length encoding" is used.

Run length encoding is effected by a portion of the circuit 152 which is grouped around RAMs 182 and 184 shown in FIG. 20B, and it is initiated whenever a "horizontal" code is issued from the comparator 174. This means that the particular coding being developed is such that it does not fit into the positional coding shown in Rows #1–#7 shown in FIG. 19. In other words, there are strings of pixels in a particular row "n" (like Line #2 in FIG. 17, for example) in which there is no change in the color of the pixels in that row which occur within ±3 pixel positions of similar changes within the row "n-1". The RAMs 182 and 184 are 4K×16 bit RAMs in the embodiment described; these RAMs have addresses (L) which are supplied from the counter 161, and the data is clocked into the RAMs by a clock "c".

Continuing with the run length encoding being described, assume that an output other than "PASS" is obtained from the comparator 174 over conductor 186. This binary one is fed into one input of a NOR gate 188, with the remaining input to this gate coming from the output of the RAM 164 via conductor 190 which is connected to conductor 166. It should be recalled that conductor 166 contains the COC bit under consideration as discussed earlier herein. A binary one on conductor 186 (coming from comparator 174) causes the output of NOR gate 188 to generate a binary "1" which is fed into one input of an AND gate 190. Normally, the change of color bit on conductor 190 is a binary 0. Assume that the output of the RAM 182 is a binary 0 at this time; this output is fed over conductor 192 to one input of an adder 194 whose other input is hardwired to receive a binary 1 thereon. The output of the RAM 182 is then fed back through the adder 194 to accumulate a count on the adder 194, with this count passing over a 14 bit bus 192 and being stored in a location in the RAM 182, with the row or Line # being determined by the L input to this RAM. In this way, the number of pixels of the same color in a given row "n" is accumulating at a location "L" in the RAM 182. When there is a change in pixel color or a transition, a binary 1 coming over the conductor 190 is used to clock the count in the RAM 182 into the RAM 184. At this time, the actual color of the run of consecutive pixels of the same color is also clocked into the RAM 184. The actual pixel color is obtained over conductor 198 and inverter 200. The output of RAM 184 is used for the CCITT coding of a horizontal "run" of a length equal to the number of pixels accumulated in RAM 182 at location L since the occurrence of the last change of color bit "1" on conductor 190 for row "n".

Figure 21:
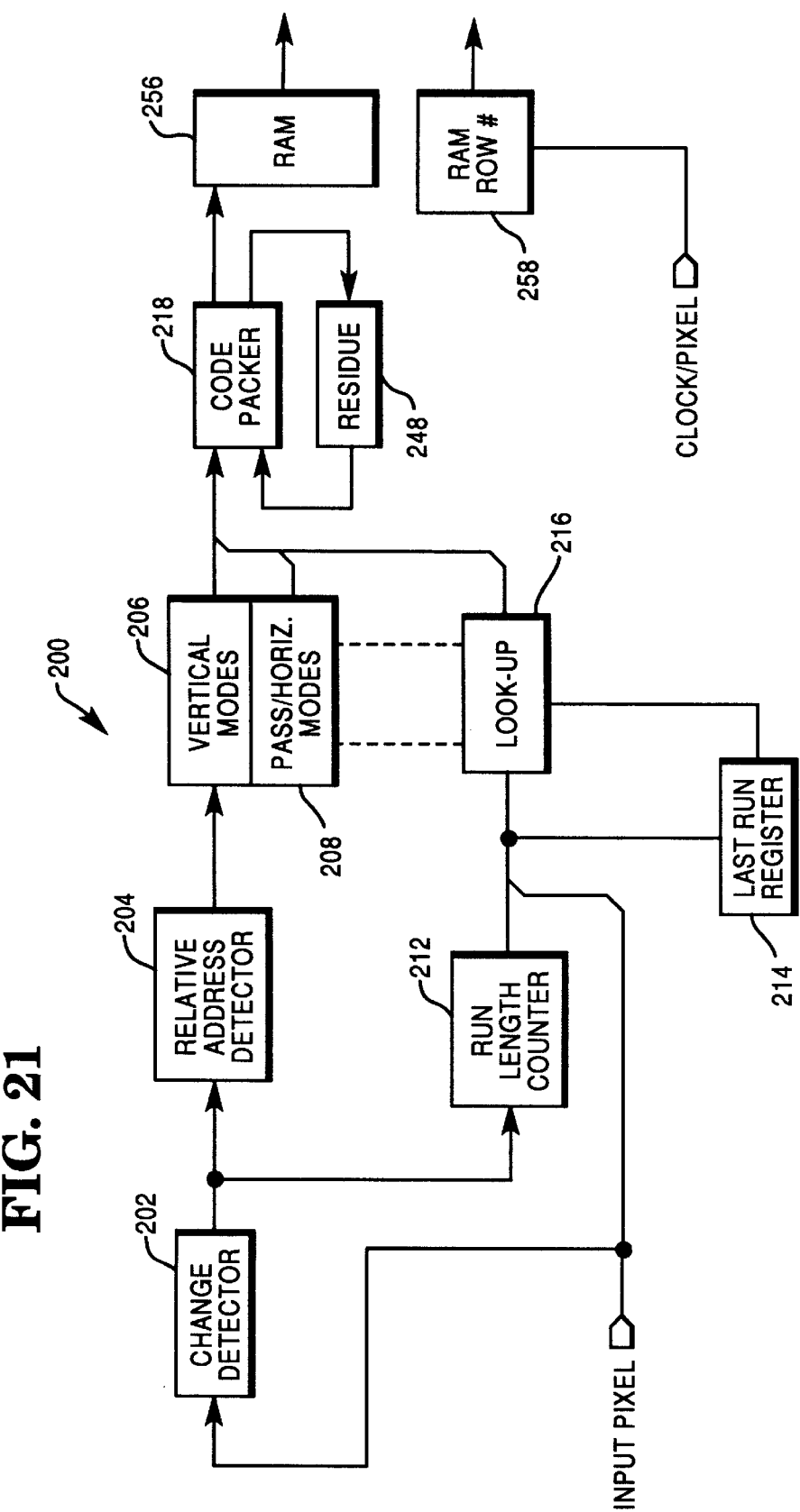
FIG. 21 is a general schematic diagram showing an overall view of a compressor used in the system shown in FIG. 1, with one such compressor being provided for each channel shown in FIG. 1.

FIG. 21 is a general schematic diagram of a compressor 200, with one such compressor being provided for each of the compressors #1–#N shown in FIG. 1. The circuit diagram 150 (FIGS. 20A and 20B) is part of the compressor 200, and it is useful to utilize FIG. 21 to summarize what has been explained relative to FIGS. 20A and 20B. As previously stated, the input to the compressor 200 (like compressor #1 shown in FIG. 1) is serial single bit pixels from the associated thresholder (like thresholder #1 shown in FIG. 1), with the pixels coming in one column at a time, and with the compression being done along rows of pixels as formed when the columns are arranged side by side.

The first stage in the process involves comparison of the next column pixel received to the previous pixel in that row. The output of the change detector 202 (FIG. 21) indicates that the color of the pixels in a row has changed on the pixel point just after the change. The RAM 156 and the Exclusive OR gate 158 (FIG. 20A) are part of the change detector 202.

The next stage of processing in the compressor 200 (FIG. 21) compares the pixel location of changes in the current or target row with changes in the prior or reference row within the range of three pixels ahead and three pixels behind the pixel under consideration. It should be recalled that the comparing is done with COC bits corresponding to the thresholded pixels. The comparing is done as described in association with FIG. 19. This comparing is accomplished by shifting the output from the change detector 202 through the relative address detector 204 which includes the RAMs 164 and 170 (FIG. 20A) and the comparator 174. The output of a previous row or Line (FIG. 17) is shifted through the seven bit RAM 170 while the output for the current row is delayed by four pixels by shifting through the RAM 164. The outputs of the RAMs 164 and 170 are compared in the comparator 174 to indicate one of seven Vertical modes as discussed in relation to FIG. 19. The comparator 174 is conventional, and it includes logic circuitry to determine the codes discussed in relation to FIG. 19. The outputs from the comparator 174 include the Vertical modes 206 and the Pass and Horizontal modes 208. If two COC bits in a previous or reference row have shifted through without a corresponding COC bit in the current row, a Pass mode is indicated and the changes are erased. A Pass mode is indicated by a single code (0001) as indicated under Column #4 of Row #9 of FIG. 19. This mode means in effect, "Skip the two COC bits in the reference line or row and begin coding at the next COC bit". Should pixel color changes shift through without qualifying for Vertical or Pass modes, a Horizontal mode will be indicated.

In the case of a Horizontal mode, previously referred to as run length encoding, the length and color of the runs must be known. In this regard, the run length counter 212 is always active. The run length counter 212 includes the adder 194 and the RAM 182 shown in FIG. 20B, and the color of the run is received over conductor 198. Whenever there is a change in the COC bit, a count begins to accrue on the RAM 182 as previously explained. The count on the RAM 182 continues to accrue as long as there is no change in the COC bit. As soon a next change occurs, the count which is presently on the RAM 182 is transferred to the last run register 214 (which corresponds to the RAM 184 shown in FIG. 20B) along with the color of the "run" of pixels. After the count is transferred, a new count begins to accrue on the RAM 182. The outputs of the relative address detector 204 (FIG. 21) and the run length counter 212 are coupled to a look-up table 216. When Vertical or Pass modes are detected, the output of the RAM 184 is ignored, and look up depends on the output of comparator 174 only. In the horizontal mode, the output of the RAM 184 drives the look-up table 216. The output of the look-up table 216 represents the appropriate Modified Relative Address (RE-AD) code (specified in CCITT Group 4 convention) for the selected mode and context. The RE-AD codes are of varying bit lengths; they are generated in a consolidated form with the leading zeros omitted. Each code has an associated word length in a separate field. The codes from the look-up table 216 enter a code packer 218 which uses the word length in the separate field to construct the full code for the selected mode and justify it immediately following the previous code for the row. This aspect will be described in more detail hereinafter.

Some additional comments appear in order for the examples shown in FIG. 19. As previously stated, the vertical coding of the pixel or the associated COC bit in the target row applies to seven pixels in the prior or reference row. The seven pixels include the three pixels before and the three pixels after the COC bit plus the pixel directly above the COC bit under consideration in the target row. In FIG. 19, those COC bits 176 and 178 are located in the reference row and can also be referred to as residing in an N-1 row, whereas the COC bit 180 is located in the target row or the N row. The examples in Rows #1–#7 in FIG. 19 cover those situations in which the COC bit in the target or N row can be referenced to a COC bit which is a binary 1 in the reference or N-1 row. Notice that there is no COC bit in the reference row shown in Row #8 in FIG. 19. This means that the COC bit 220 cannot be referenced to a COC bit in the reference row 222. In other words, the arrangement shown in Row #8 in FIG. 19 cannot be expressed by one of the V or Vertical mode code situations shown in Rows #1–#7 or the Pass or P shown in Row #9; this is referred to as a Horizontal coding situation. The Horizontal coding situation means that the system will resort to run length encoding to encode the COC bits in the target row as discussed with regard to the run length counter 212. The code words according to the CCITT coding for the various V codes are shown under column #4 in FIG. 19. For example, the code word for the V code shown under column #2 of Row #5 is "010". These code words are stored in the Look-up table 216 and become the output therefrom when accessed as will be described hereinafter.

Figure 22:
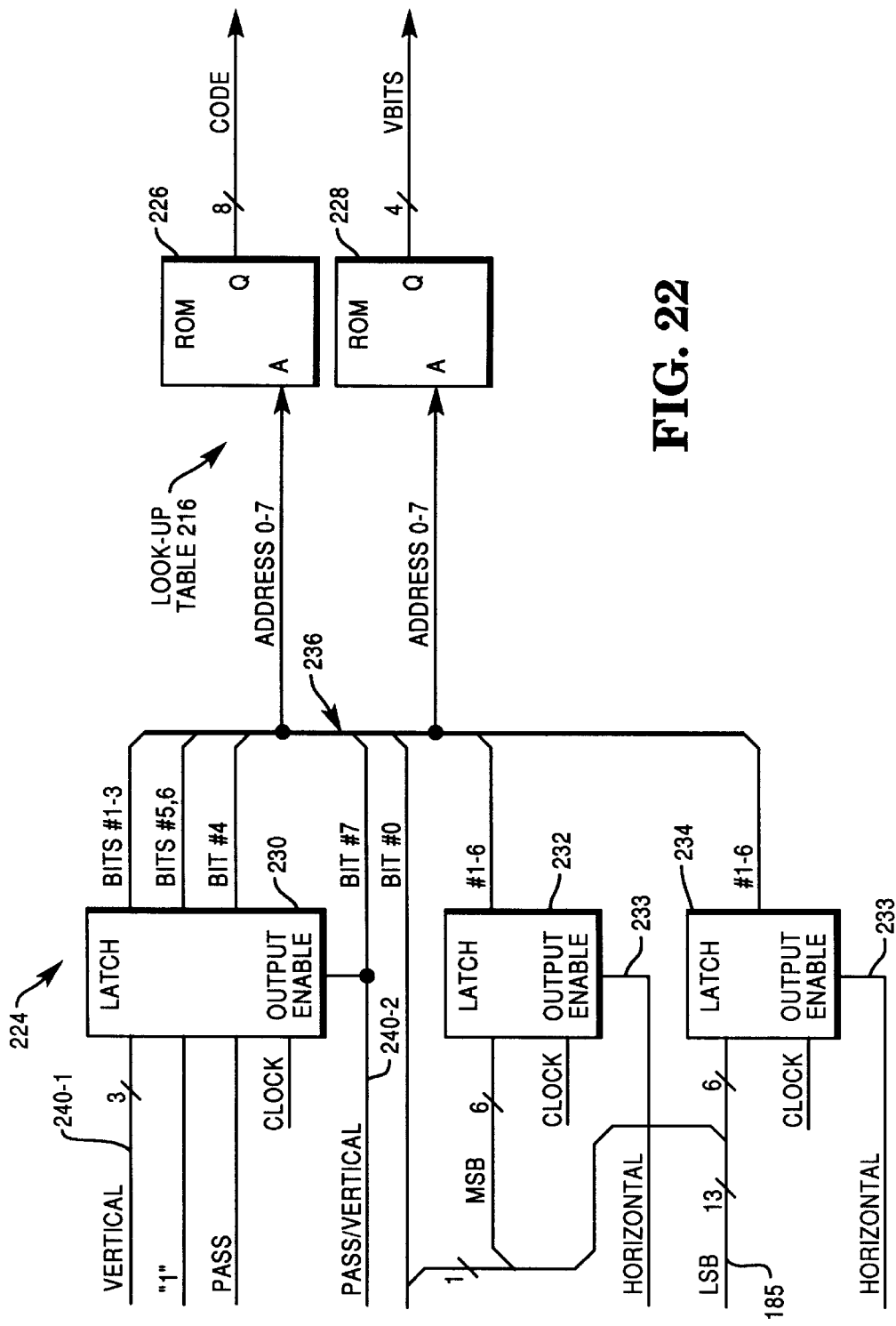
FIG. 22 is a schematic diagram showing a circuit which performs the function of translating the output of a comparator shown in FIG. 20 into CCITT Group 4 codes.

FIG. 22 is a schematic diagram of a circuit 224 which includes the look-up table 216 discussed in relation to FIG. 21. The inputs to the circuit 224 come from the outputs of the comparator 174 and the RAM 184 shown in FIG. 20B. The look-up table 216 is comprised of ROMs 226 and 228, and these ROMs are used to generate the CCITT codes mentioned earlier herein; these codes are the ones shown under Column #4 in FIG. 19 and the Run length codes mentioned.

As alluded to, the circuit 224 in FIG. 22 performs the function of translating the output of the comparator 174 and the output of the RAM 184 into the CCITT codes mentioned. A latch 230 accepts the outputs of the comparator 174 shown in FIG. 20, and similarly, latches 232 and 234 accept the output of the RAM 184 (FIG. 20B) when a Horizontal mode is detected. There are 13 conductors in the bus 185 leaving the RAM 184 and entering the circuit 224. Six bits, the most significant bits (MSB), enter the latch 232, and the six least significant bits (LSB) enter the latch 234. The "color" bit is carried as one of the 13 conductors in the bus 185. With regard to latch 230, the output of the comparator 174 is fed thereto via the Vertical, Pass and Horizontal conductors as previously described. An example will make the various outputs more readily understandable.

Figures 22A, 22B:
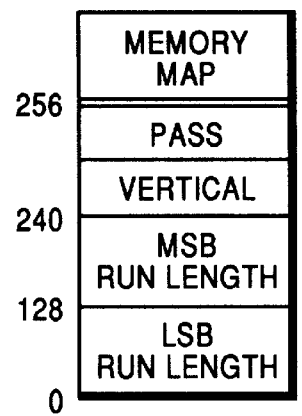
FIG. 22A is a chart showing various bit positions are used to address a Look-up table shown in FIG. 21.
FIG. 22B is a memory map showing the organization of data in the ROMs shown in FIG. 22.

FIG. 22A shows a chart 238 indicating what data is on the address bus 236 (FIG. 22) leading to the Look-up table 216. For example, if the coding process indicates a $V_R(1)$ code situation as shown under Column #2 in Row #3 of FIG. 19, the shorthand coding indicates a (5) under Column #3, and the desired code output from the Look-up table 216 is "011" which is shown under Column #4. From the data under Column #3, it is apparent that three binary bit positions are adequate to express the data. In the example being described, the (5) mentioned is coded as a binary "101" and occupies bits #1–#3 in chart 238; these three bits enter the latch 224 (FIG. 22) via bus 240-1. Bit position #0 is a color bit; however, when utilizing the V codes mentioned, it becomes a "don't care" bit. This is because the same Vertical or V codes are used for black or white binarized data under the conventional coding mentioned; however, this bit position becomes important when the horizontal encoding is employed. Bit position #4 becomes a "1" or true when a Pass mode is indicated by the comparator 174 shown in FIG. 20B; otherwise, it is "0" when a V code is generated. Bits #5 and #6 coming from the output of latch 230 are each forced to a binary "1" whenever a pass or a V code appears on conductor 240-2 which becomes bit position #7. In the embodiment described, a "1" on conductor 240-2 is used to enable the latch 230. In other words, latch 230 is enabled to handle the V codes and the pass code, while the latches 232 and 234 are enabled to handle the horizontal codes. Bits #5 and #6 are used to indicate the number of valid bits in the V codes, and in the example being described, the number of valid bits is three, requiring only two binary bit positions. A "0" on conductor 240-2 disables the latch 224.

When a "horizontal" mode is generated by the comparator 174 in FIG. 20B, the output of the RAM 184 is latched in the latches 232 and 234 shown in FIG. 22 by a signal appearing on conductor 233. It should be recalled that the bottom half of the circuit 152 in FIG. 20B, including the RAM 184, is that portion of this circuit which generates the horizontal codes for a string of black pixels or a string of white pixels. The strings of pixels can vary in length from three to over 100, for example. The output of the RAM 184 in FIG. 20B is carried on a 13 conductor bus 185, with the six MSB (bits) being directed to latch 232 (FIG. 22) and the six LSB (bits) being directed to latch 234. The 13th bit or the color bit is shown as "Color" in FIG. 22; it becomes Bit #0 for addressing the ROMs 226 and 228. After the data is latched in the latches 232 and 234, two clock cycles are used to create the full code for the run length coding in the horizontal mode. The first clock is used to apply the MSB #1–6 to the ROM 226, and the second clock is used to apply the LSB #1–6 to the ROM 228. With regard to bit positions for addressing the ROMs 226 and 228, FIG. 22A may be consulted. Bit #0 contains the "color" bit, and Bit #4 would contain a "1", indicating that this particular address is for the Horizontal coding. Bits #1–3 and Bits #5–7 are used for the MSB #1–6 on the first clock cycle for addressing the ROM 226, and similarly, these same bit positions (FIG. 22A) are used for the LSB #1–6 on the second clock cycle for addressing the ROM 228.

FIG. 22B is a memory map which shows how data is stored in the ROMs 226 and 228. With regard to the CCITT Group 4 codes mentioned, these particular codes are divided into three segments. They are: 1) The LSB run lengths or "Terminator" codes; 2) The MSB run lengths or "Makeup" codes; and 3) The Vertical/Pass/Horizontal codes as shown. An important feature of this invention is that these codes fit into a 256 byte ROM.

Notice from the coding shown in FIG. 19 that the code words shown under Column #4 vary in length from one bit (as shown in Row #4) to seven bits (as shown in Row #1). In order to save on memory space and to reduce processing time, ROM 226 in FIG. 22 stores eight bits of data, and ROM 228 stores four bits of data. The least significant bits (which vary in length from one to seven) are stored in the ROM 226, and the four bits in the ROM 228 are used to indicate the length of the valid bits within the ROM 226. The function of saving memory space is effected by the code packer 218 shown in FIG. 21.

Figure 23:
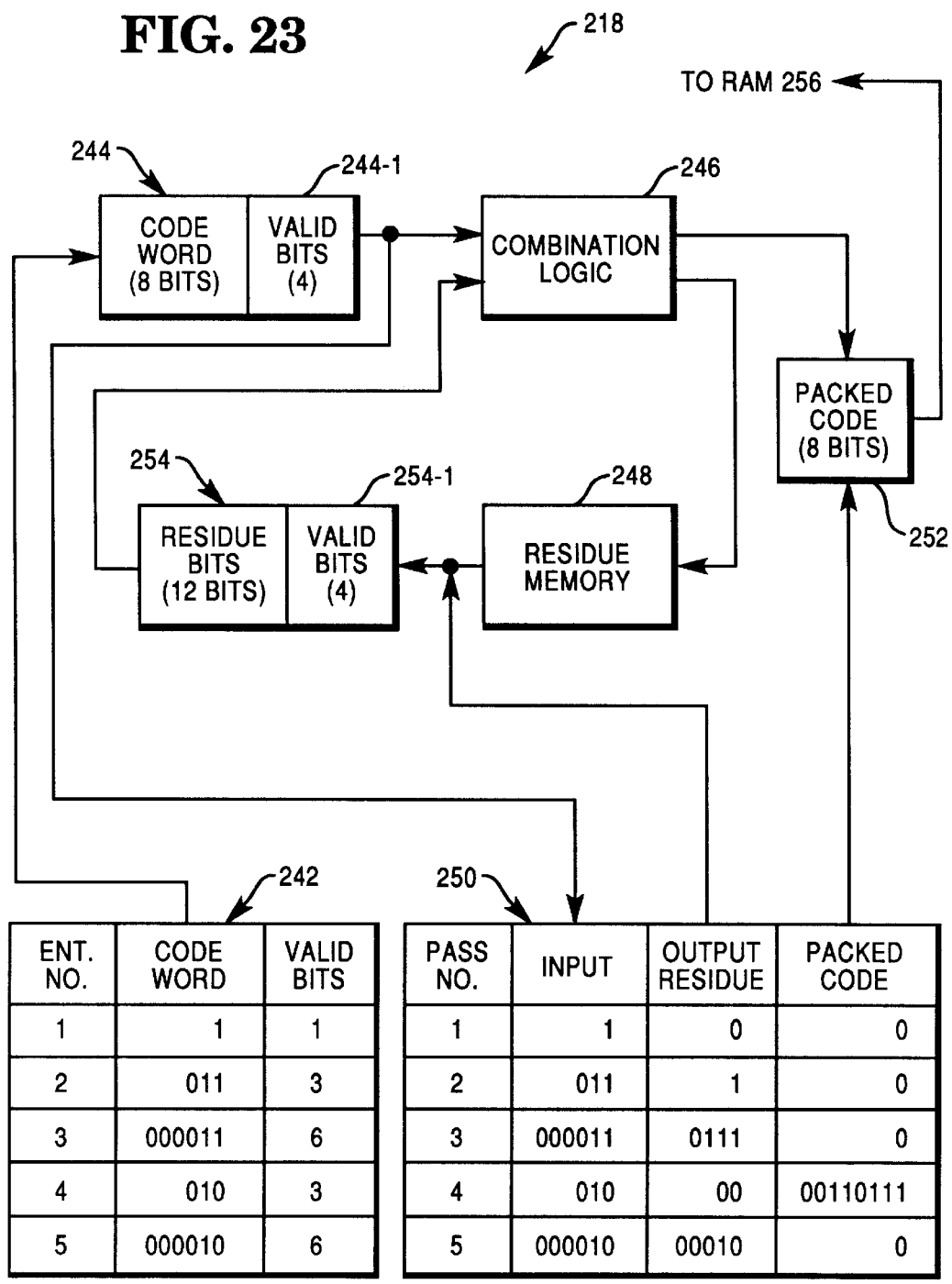
FIG. 23 is a schematic diagram showing how the code packer shown in FIG. 21 functions.

To explain the operation of the code packer 218, it is useful to refer to FIG. 23 which is a schematic diagram showing how the code packer 218 functions. As previously stated, the individual entries coming from the Look-up table 216 in FIG. 21, may be comprised of a variety of code words. For example, the Table 242 in FIG. 23 contains columns for: Entry Number (Ent. No.); Code Word; and Valid Bits. The entry numbers 1–5 relate to sample entries. The code words relate to the code words shown shown under column #4 in FIG. 19; these are the CCITT code words ranging from 1–7 bits. The valid bits in Table 242 give an indication as to how many of the Least Significant Bits (LSB) in the code words are valid bits. Block 244 in FIG. 23 shows that eight bits are provided for the code word and four bits are provided for the associated code words. For example, entry #1 in Table 242 indicates a code word of "1", and the valid bits section 244-1 of block 244 would indicate a "1", showing that there is only one valid bit in the code word. Entry #3 in Table 142 has a code word of "000011" and its associated valid bits column indicates (6); this means that the block 244-1 would have a binary representation of a "6" or "0110". A function of the code packer 218 is to take the code words, which can vary in length as seen in the few examples given, and pack the code words into eight bit bytes.

The code packer 218 includes combination logic 246 and a residue memory 248 shown in FIG. 23. Table 250 is utilized to show how code words of varying length are packed into eight bit bytes. Naturally, the packing could be done into 16 bit words or other lengths if necessary or desirable. Table 250 has columns which are entitled: Pass Number (Pass No.); Input; Output Residue; and Packed Code. Assume that the entries 1–5 from Table 242 are the consecutive entries to be packed; these entries correspond to the inputs #1–#5 shown in Table 250. On Pass #1, code word for Ent. No. 1 enters the combination logic 246; at this time, there in no output under Output Residue, and there is no output under Packed Code because there is just one and not eight bits to fill the packed code shown as block 252. On Pass #2, the code word "011" from Entry No. 2 enters the combinational logic 246; at this time, there is an Output Residue of "1" from the residue memory 248, and there is no output under Packed Code. A point to be made here is that as code words are added during the "packing" process being described, the valid bits are "added" to the partially packed code appearing in the residue block 254. For example, at the third pass shown in Table 250, the residue bits are "0111"; the valid bits appearing in block 254-1 would be a binary "0100" or a "four" which is obtained by adding a "1" valid bit from Entry No. 1 and "3" valid bits from Entry No. 2. At the fourth pass shown in Table 250, the output residue of "0111" is packed or combined with the four rightmost bits of the "000011" input from pass #3 to arrive at the packed code of "00110111"; this is the first packed code which is outputted from the code packer 218. As seen from Pass No. 4 in Table 250, the output residue for Pass No. 4 is "00"; this represents the two left most bits of the input from Pass No. 3. The valid bits appearing in block 254-1 would be adjusted to reflect the fact that eight bits have been packed and outputted; therefore, the number of valid bits remaining in block 454-1 would be a binary "2", corresponding to the output residue of "00" appearing for Pass No. 4 in Table 250 in the example being described.

To review, the code packer 218 (FIGS. 21 and 23) takes the code words discussed in relation to column #4 in FIG. 19 and appends them, one after another, to fit into an series of eight bit bytes. In effect, a series of consecutive codes is provided, with these codes representing the change of pixel color (black/white) within a row as one progresses across a series of columns of data. The packed codes coming from the code packer 218 are sent to a RAM memory 256 (FIG. 21), and the row numbers for the codes are stored in the RAM memory 258.

Figure 24:
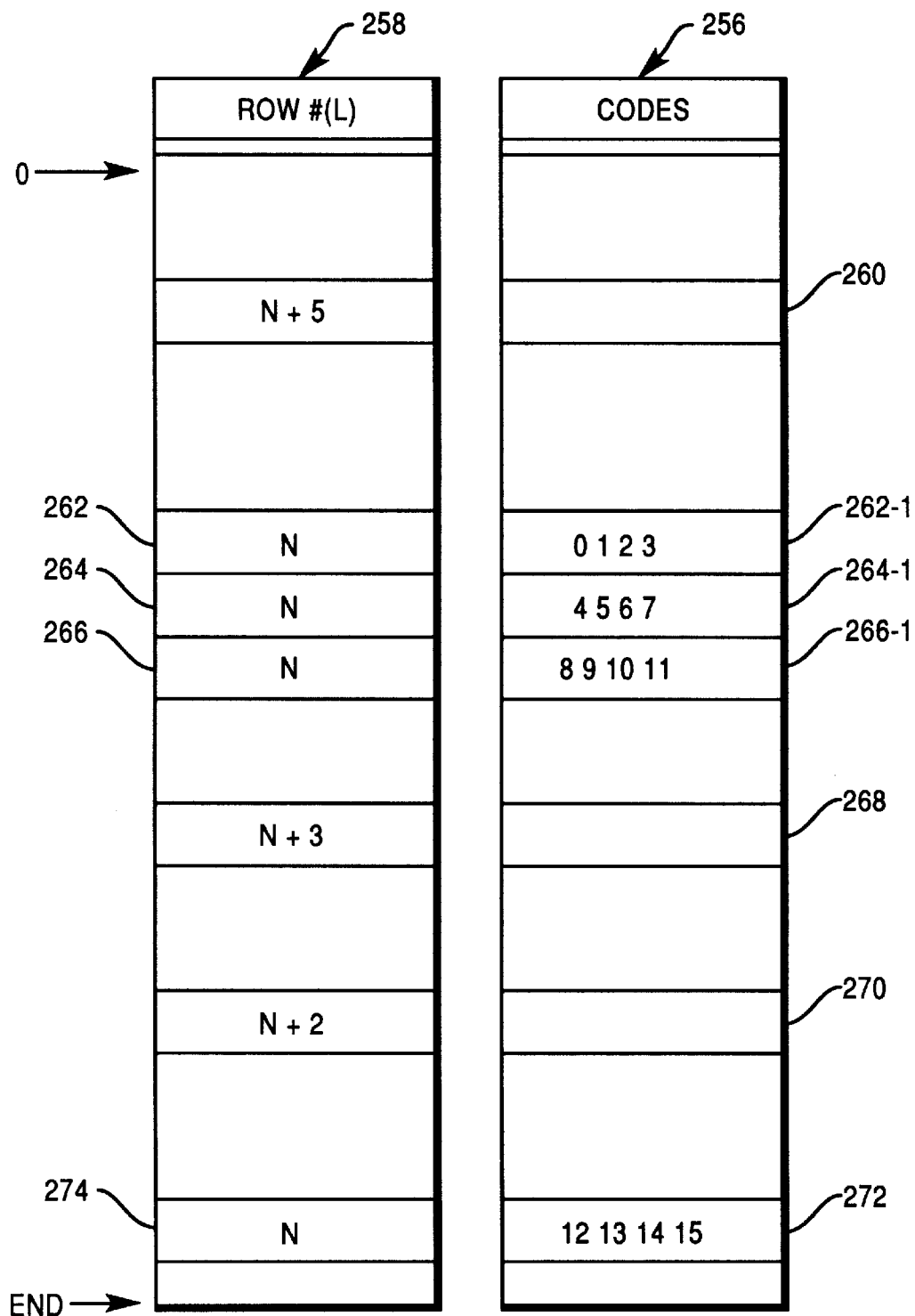
FIG. 24 is a schematic diagram showing the memory organization for certain memories shown in FIG. 21.

FIG. 24 shows the memory organization for the memory 256 and memory 258. One of the points to mention here is that the codes which are packed at block 252 in FIG. 23 do not necessarily come out in nice neat eight bit bytes which are associated with a window position as shown for window N in FIG. 16. In other words, the code word for a window position may be very short as shown under Column #4 in FIG. 19 for the V (0) situation shown therein. This means there would be no output or packed eight bit byte for this row position and window. The evaluation for the coding associated with FIG. 19 would then proceed to next lower window position, as viewed in FIG. 16, where evaluation would be continued. Assume that the first packed code from block 252 in FIG. 23 occurs for row N+5 as shown in FIG. 24. Because this is the first output from block 252 in the example being discussed, the N+5 entry would be positioned close to the start of the memory 258, with the start being indicated by a "0" and with the end of the memory 258 being indicated by "end". Also, for every address in memory 258, there is a corresponding address in memory 256 where the associated codes are stored. The memory address is "L" which is generated as previously discussed in relation to FIGS. 20A and 20B. To review, these are the code words shown in Column #4 in FIG. 19.

In the example being described, the code words associated with the N+5 entry would be placed in block 260 in FIG. 24. Next, assume that there are several entries for row N as shown by blocks 262, 264, and 266, along with their associated entries shown in blocks 262 -1, 264-1, and 266-1, respectively. Thereafter, there are entries associated with rows N+3, N+2, and N as shown in FIG. 24, along with their associated codes positioned in blocks 268, 270, and 272, respectively, with the actual codes being left out of these blocks. From what has been described, it follows that the entries for a particular row "N" may be located in several places in the memory 258. It is also conceivable that one might have one coding for the entire first row, for example, if all the columns starting at column 14-21 and ending at the extreme left of the document 12 (as viewed in FIG. 16) were white (ie. no change in color). In this situation, the coding for the entire first row might be positioned near the bottom of the memory 258. A general way of looking at this procedure is that the storing is done as the window #N is FIG. 16 is moved downwardly and is then shifted over one column to the left; this process is repeated until the window reaches the left side of the document 12.

The data which is in the memory 256 in FIG. 24 comprises the compressed coding for the image of the document 12, with the row numbers for this data being located in the memory 258. As the codes are completed, they are placed in the memory 256 as previously indicated. Notice that the first entry for row #N is positioned at block 262, and the associated code words are positioned in block 262-1. The code words in block 262-1 are simply numbered consecutively to show continuity of the codes as developed; the same is true of blocks 264-1, 266-1, and 272.

It should be recalled that while the discussion has progressed relative to compressor #1 as viewed in FIG. 1, the remaining compressors in the system 10 are performing compression as described. Because the data from the scanning line 14 was divided into four channels in the example being described, it is necessary to consolidate or concatenate the outputs from each of the channels. This function is performed by the consolidator 34 as discussed in relation to FIG. 1. The actual concatenation process can be implemented in either hardware or software.

The concatenation is effected by searching memory 258 (FIG. 24) for all the addresses which are associated with row #1 or row #N in the example being described. This searching is effected by starting at the beginning of the memory 258 and working towards the end thereof. In this regard, the codes for #N row would be concatenated by adding together or "stringing out" the codes which appear in blocks 262-1, 264-1, 266-1 and 272 in that order. Next, the codes for #N++1, #N+2, #N+3, etc. would be concatenated until all the rows for this channel are processed. For channel #1 being described, these are rows #0–#224 as seen from FIG. 3.

The data from compressors #2, #3, #N shown in FIG. 1 are concatenated as just described in relation to channel #1. Once the data from each of the channels is concatenated, this data is grouped into one file or stream of data. In other words, after the data for row #224 from channel #1 is concatenated, the data for row #225 (FIG. 3) is grouped thereafter so that all the rows of data from #0 through #899 in the embodiment being described are grouped. This means that the rows of data are now in a format to enable the data to be sent to a utilization means 38 as discussed in relation to FIG. 1. When the data is sent from the consolidator 34 to the utilization means 38, there are also some conventional codes which are sent at the start of the transmission. The codes may include, for example, the number of pixels in a row and the number of columns of data which are present; these numbers are the same for each of the channels #1–#N. Once the data is in the format described, there are conventional algorithms which handle the processing of data according to the CCITT coding mentioned. Because this aspect is conventional, it need not be discussed any further.

Some of the additional advantages of this invention are as follows:

1). It minimizes the data at the "output" of the system 10 so that more conventional transmission means can be used for transmission.

2). Large amounts of internal memory are not required to process the images.

3). Because the pixel data for a document 12 are not all accumulated before processing begins, the latency from input to output for the system 10 is minimized.

What is claimed is:

1. A method of compressing non-transposed data comprising the steps:

(a) receiving successive non-transposed columns of binary pixels representing data on a document using a document scanner, with said successive non-transposed columns of binary pixels including a first non-transposed column of binary pixels and a last non-transposed column of binary pixels to be processed, said successive non-transposed columns of binary pixels being derived from the same document;

(b) using an examining window to extend over a predetermined number of said successive non-transposed columns along a direction which is perpendicular to the direction of said columns so as to present a row of said binary pixels, with said using step using only one binary pixel from each of said non-transposed columns of binary pixels for said row of binary pixels;

(c) generating a change of color bit for each of the binary pixels in the examining window, starting with said first non-transposed column of binary pixels while said examining window is moved towards said last non-transposed column of binary pixels;

(d) examining a pixel in a target row under consideration in said window with regard to a reference row and designating coding according to a predetermined code which uses said reference row for compressing pixels in said target row, with said reference row and said target row being perpendicular to said successive non-transposed columns of binary pixels;

(e) compressing said target row starting with said first non-transposed column of binary pixels while said examining window is moved towards said last non-transposed column of binary pixels, with said compressing step (e) being initiated after receiving said first non-transposed column of binary pixels but before said last non-transposed column of binary pixels is received;

(f) repeating steps (b), (c), (d), and (e) for the remaining non-transposed columns of binary pixels on the document.

2. A method of processing non-transposed data comprising the steps of:

(a) scanning a document using a document scanner in a first direction to generate successive non-transposed scan lines of pixels corresponding to an image on the document, with said successive non-transposed scan lines of pixels including a first non-transposed scan line of pixels and a last non-transposed scan line of pixels to be processed, said successive non-transposed scan lines of pixels being derived from the same document;

(b) dividing each non-transposed scan line of pixels into a plurality of processing channels so that each processing channel comprises a predetermined number of the pixels in each of said scan lines and each processing channel has boundaries which are aligned in a second direction which is perpendicular to said first direction;

(c) accumulating a predetermined number of said non-transposed scan lines of pixels as successive non-transposed scan lines are generated prior to performing compression on said pixels, with said predetermined number of non-transposed scan lines having an oldest non-transposed scan line and a newest non-transposed scan line therein;

(d) compressing the predetermined number of non-transposed scan lines of pixels in each of the processing channels simultaneously so as to perform parallel compression, with the compression in each processing channel being performed by using a reference row which is parallel to a target row being compressed, with the reference and target rows being perpendicular to said first direction and parallel to said boundaries of said processing channels, and with said compressing being performed on said target rows, and with said accumulating step including only one said pixel from each one of said successive non-transposed scan lines of pixels in said target rows, with said compressing starting with said first non-transposed scan line of pixels and working towards said last non-transposed scan line of pixels before said last non-transposed scan line of pixels has been generated by said scanning step (a); and (e) repeating said compressing step for the remaining non-transposed scan lines of pixels on said document by dropping off at least the oldest non-transposed scan line and picking up at least the newest non-transposed scan line in said predetermined number of non-transposed scan lines as said scanning proceeds across the same document using the document scanner.

3. The method as claimed in claim 2 in which said compressing step is started in each of said processing channels after said predetermined number of non-transposed scan lines of pixels is generated and before the entire image of the document is scanned using the document scanner.

4. A system for compressing non-transposed data comprising:

a document scanner for receiving successive non-transposed columns of binary pixels representing data on a document, with said successive non-transposed columns of binary pixels including a first non-transposed column of binary pixels and a last non-transposed column of binary pixels to be compressed, said successive non-transposed columns of binary pixels being derived from the same document;

examining means including an examining window to extend over a predetermined number of said successive non-transposed columns along a direction which is perpendicular to the direction of said columns so as to present a row of pixels; and means for generating a change of color bit for each of the pixels in the examining window, starting with said first non-transposed column of binary pixels while said examining window is moved towards said last non-transposed column of binary pixels;

said examining means being effective to examine a pixel under consideration in a target row in said window with regard to a reference row and to designate coding according to a predetermined code which uses said reference row for compressing pixels in said target row, with said reference row and said target row being perpendicular to said successive non-transposed columns of binary pixels, with each said target row including only one said pixel from each one of said successive non-transposed scan lines of pixels, and with said examining means being effective to start examining the pixels under consideration in the target row after the first non-transposed column of binary pixels is received but before the last non-transposed column of binary pixels is received using said document scanner.

5. A system for processing non-transposed data comprising:

a document scanner for scanning a document in a first direction to generate successive non-transposed scan lines of pixels corresponding to an image on the document, with said successive non-transposed scan lines of pixels including a first non-transposed scan line of pixels and a last non-transposed scan line of pixels to be processed, said successive non-transposed scan lines of pixels being derived from the same document;

means for dividing each non-transposed scan line of pixels into a plurality of processing channels so that each processing channel comprises a predetermined number of the pixels in each of said scan lines and each processing channel has boundaries which are aligned in a second direction which is perpendicular to said first direction;

means for accumulating a predetermined number of said non-transposed scan lines of pixels as successive non-transposed scan lines are generated prior to performing compression on said pixels, with said predetermined number of non-transposed scan lines having an oldest non-transposed scan line and a newest non-transposed scan line therein;

means for compressing the predetermined number of non-transposed scan lines of pixels in each of the processing channels simultaneously so as to perform parallel compression, with the compression in each processing channel being performed by using a reference row which is parallel to a target row being compressed, with the reference and target rows being perpendicular to said first direction and parallel to said boundaries of said processing channels; and said means for compressing being effective to compress the remaining non-transposed scan lines of pixels on said document by dropping off at least the oldest non-transposed scan line and picking up at least the newest non-transposed scan line of pixels in said predetermined number of non-transposed scan lines of pixels as said scanning proceeds across the document using said document scanner with each said target row including only one said pixel from each one of said successive non-transposed scan lines of pixels, and with the compression being initiated with said first non-transposed scan line of pixels while working towards said last non-transposed line of pixels but before said last non-transposed scan line of pixels has been generated by said document scanner.

6. A method of processing non-transposed image data on a document having first and second dimensions, with said document having lines of data thereon aligned substantially parallel to said first dimension, said method comprising the steps of:

(a) feeding said document in a direction parallel to said first dimension of said document;

(b) scanning said document using a document scanner in a scanning direction which is perpendicular to said first dimension of said document and perpendicular to said lines of data to generate successive non-transposed scan lines of pixels including a first non-transposed scan line of pixels and a last non-transposed scan line of pixels, said successive non-transposed scan lines of pixels being derived from the same document;

(c) arranging a minimum number of said non-transposed scan lines of pixels to present rows of said pixels perpendicular to said scanning direction to enable compression by a compression algorithm using a reference row which is parallel to said rows of said pixels and perpendicular to said scanning direction, with each one of said rows of said pixels including only one said pixel from each said successive non-transposed scan lines of pixels, with said compression algorithm generating Relative Address codes, hereinafter referred to as Re-Ad codes, and with said compression being initiated with said first non-transposed scan line of pixels while working towards said last non-transposed scan line of pixels but before said last non-transposed scan line of pixels has been generated by said scanning step (b);

(d) storing said Re-Ad codes in a memory for each of said rows of pixels as said scanning proceeds from said first non-transposed scan line of pixels towards said last non-transposed said scan line of pixels using the document scanner;

(e) dropping off an oldest one of said successive non-transposed scan lines of pixels and picking up a newest one of said successive non-transposed scan lines of pixels so as to maintain said minimum number of said non-transposed scan lines of pixels for generating said Re-Ad codes for said rows of said pixels as said scanning proceeds from said first one of said successive non-transposed scan lines of pixels for said document towards said last one of said successive non-transposed scan lines of pixels thereon;

(f) repeating said steps (d) and (e) until said last non-transposed scan line of pixels is encountered;

(g) withdrawing said Re-Ad codes from said memory starting with a first of said rows of said pixels;

(h) repeating said step (g) for the rows of said pixels remaining in said memory; and (i) concatenating said Re-Ad codes from steps (g) and (h) to present compressed data corresponding to said image data on said document.

7. The method as claimed in claim 6 in which said feeding step (a) is effected by feeding said document in a document track on a side having said first dimension, with said first dimension having a length substantially greater than said second dimension to facilitate said feeding of said document.

8. A method of processing non-transposed image data on a document having first and second dimensions, with said document having lines of data thereon aligned substantially parallel to said first dimension;

said method using a compression algorithm that generates Relative Address codes, hereinafter referred to as Re-Ad codes, through using a reference row for compressing a target row of pixels; and said method requiring feeding of said document in a direction parallel to said first dimension, and said method requiring scanning of said document using a document scanner in a direction perpendicular to first dimension;

said method comprising the steps of:

(a) feeding said document in a direction parallel to said first dimension of said document;

(b) scanning said document using a document scanner in a scanning direction perpendicular to said first dimension of said document and perpendicular to said lines of data to generate successive non-transposed scan lines of pixels including a first non-transposed scan line of pixels and a last non-transposed scan line of pixels, said successive non-transposed scan lines of pixels being derived from the same document; and (c) arranging a minimum number of said non-transposed scan lines of pixels to present target rows of said pixels perpendicular to said scanning direction to enable compression by said compression algorithm using a reference row which is parallel to said target rows of said pixels and perpendicular to said scanning direction, with said arranging step being effective for including only one said pixel from each one of said successive non-transposed scan lines of pixels in said target rows; and (d) compressing said target rows of said pixels so that said compressing step is initiated after said first non-transposed scan line of pixels is generated by said scanning step but before said last non-transposed scan line of pixels is generated using the scanner.

9. A method of processing non-transposed image data on a document having first and second dimensions, with said first dimension being longer than said second dimension, and with said document having lines of data thereon aligned substantially parallel to said first dimension, said method comprising the steps of:

(a) scanning said document using a document scanner in a first direction which is perpendicular to said first dimension of said document and perpendicular to said lines of data to generate successive non-transposed scan lines of pixels including a first non-transposed scan line of pixels and a last non-transposed scan line of pixels, said successive non-transposed scan lines of pixels being derived from the same document;

(b) arranging a minimum number of said non-transposed scan lines of pixels to present rows of said pixels perpendicular to said first direction to enable compression by a compression algorithm using a reference row which is parallel to said rows of said pixels and perpendicular to said first direction, with said compression algorithm generating Relative Address codes, hereinafter referred to as Re-Ad codes, and with said arranging step (b) being effective for including only one pixel from each of said successive non-transposed scan lines of pixels in said rows of pixels, and with said compression being initiated after said first non-transposed scan line of pixels is generated but before said last non-transposed scan line of pixels is generated by said scanning step (a);

(c) storing said Re-Ad codes in a memory for each of said rows of said pixels as said scanning proceeds from a first one of said non-transposed scan lines of pixels to a last one of said non-transposed scan lines of pixels;

(d) dropping off an oldest one of said non-transposed scan lines of pixels and picking up a newest one of said non-transposed scan lines of pixels so as to maintain said minimum number of non-transposed scan lines of pixels for generating said Re-Ad codes for said rows of pixels as said scanning proceeds from said first one of said non-transposed scan lines of pixels on said document to said last one of said non-transposed scan lines of pixels thereon;

(e) repeating said steps (c) and (d) until said last one of said non-transposed scan lines of pixels is encountered;

(f) withdrawing said Re-Ad codes from said memory starting with the Re-Ad codes associated with a first one of said rows of pixels and concatenating said Re-Ad codes until a last one of said Re-Ad codes is withdrawn from said memory.

10. A method of processing non-transposed data comprising the steps of:

(a) scanning a document using a document scanner in a first direction to generate successive non-transposed scan lines of pixels corresponding to an image on the document and including a first non-transposed scan line of pixels and a last non-transposed scan line of pixels, said successive non-transposed scan lines of pixels being derived from the same document;

(b) dividing each non-transposed scan line of pixels into a plurality of processing channels so that each processing channel comprises a predetermined number of the pixels in each of said scan lines and each processing channel has boundaries including rows of pixels which are aligned in a second direction which is perpendicular to said first direction;

(c) accumulating a predetermined number of said non-transposed scan lines of pixels as successive non-transposed scan lines of pixels are generated prior to performing compression on said pixels, with said predetermined number of non-transposed scan lines having an oldest non-transposed scan line of pixels and a newest non-transposed scan line of pixels therein;

(d) compressing the predetermined number of non-transposed scan lines of pixels in each of the processing channels simultaneously so as to perform parallel compression, with the compression in each processing channel being performed by using a reference row which is parallel to a target row of pixels being compressed to generate compressed row data for each of the rows of pixels in a channel, with the reference and target rows being perpendicular to said first direction and parallel to said boundaries of said processing channels, with each said target row including only one pixel from each of said successive non-transposed scan lines of pixels, and with said compression being initiated after said first non-transposed scan line of pixels is generated but before said last non-transposed scan line of pixels has been generated by said scanning step;

(e) storing the compressed row data in successive rows in a memory for each of the rows of pixels within a channel;

(f) dropping the oldest non-transposed scan line and picking up said newest non-transposed scan line for each of the processing channels to maintain said predetermined number of said non-transposed scan lines of pixels for compressing as said successive non-transposed scan lines of pixels are generated;

(g) repeating said steps (d), (e), and (f) for the remaining non-transposed scan lines until a last non-transposed scan line of pixels is compressed;

(h) concatenating the compressed row data for each of the channels in parallel to obtain a stream concatenated codes for each of the channels; and (i) concatenating the stream of concatenated codes for a first of said channels to a last of said channels to arrive at a stream of concatenated codes corresponding to said successive non-transposed scan lines of pixels.

* * * * *